(12) United States Patent
Perlman et al.

(10) Patent No.: US 11,595,190 B2
(45) Date of Patent: Feb. 28, 2023

(54) ENCRYPTED DATA STORAGE SYSTEM

(71) Applicant: Dell Products L.P., Round Rock, TX (US)

(72) Inventors: Radia Perlman, Redmond, WA (US); Charles Kaufman, Redmond, WA (US)

(73) Assignee: Dell Products L.P., Round Rock, TX (US)

( * ) Notice: Subject to any disclaimer, the term of this patent is extended or adjusted under 35 U.S.C. 154(b) by 159 days.

(21) Appl. No.: 17/159,903

(22) Filed: Jan. 27, 2021

(65) Prior Publication Data

US 2022/0239471 A1 Jul. 28, 2022

(51) Int. Cl.
*H04L 9/08* (2006.01)

(52) U.S. Cl.
CPC ............ *H04L 9/0822* (2013.01); *H04L 9/085* (2013.01); *H04L 9/088* (2013.01); *H04L 9/0861* (2013.01); *H04L 9/0894* (2013.01)

(58) Field of Classification Search
CPC ....... H04L 9/08; H04L 9/0822; H04L 9/0861; H04L 9/085; H04L 9/0894; H04L 9/0643; H04L 63/06; H04L 63/068; G06F 21/62; G06F 21/6218; G06F 21/60
See application file for complete search history.

(56) References Cited

U.S. PATENT DOCUMENTS

| | | | |
|---|---|---|---|
| 9,195,851 B1 * | 11/2015 | Chandra | H04L 9/0825 |
| 10,764,037 B2 * | 9/2020 | Yan | H04L 9/088 |
| 11,128,460 B2 * | 9/2021 | Perlman | H04L 9/0894 |
| 2015/0371052 A1 * | 12/2015 | Lepeshenkov | H04L 9/0866 713/165 |
| 2020/0265021 A1 * | 8/2020 | Shatsky | G06F 3/0623 |
| 2022/0209945 A1 * | 6/2022 | Li | H04L 9/0643 |

\* cited by examiner

*Primary Examiner* — Shaqueal D Wade-Wright
(74) *Attorney, Agent, or Firm* — Joseph Mencher

(57) ABSTRACT

An encrypted data storage system includes a storage system that is configured to store encrypted data, and a first client device that is coupled to the storage system. The first client device performs a hash operation on first data to generate a Data Encryption Key (DEK), and uses the DEK to perform a data encryption operation on the first data to generate encrypted first data. The first client device then uses a first Key Encryption Key (KEK) to perform a first key encryption operation on the DEK to generate a first encrypted DEK, associates the first encrypted DEK with the encrypted first data, and transmits the encrypted first data to the storage system for storage.

20 Claims, 16 Drawing Sheets

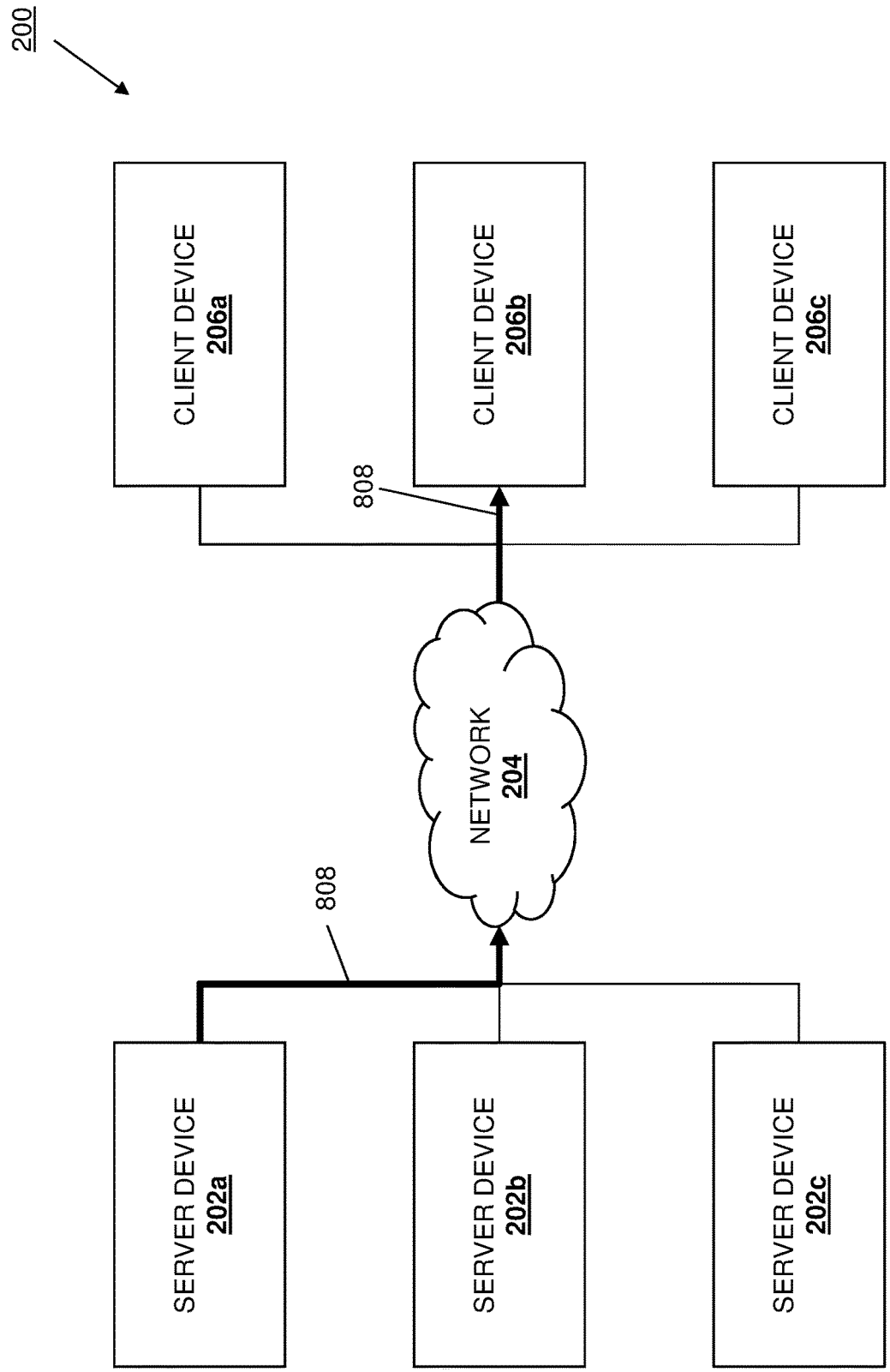

ENCRYPTED DATA STORAGE SYSTEM

BACKGROUND

The present disclosure relates generally to information handling systems, and more particularly to the storage of encrypted data by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and other storage systems known in the art, are sometimes utilized to store data for client devices and return that data to those client devices upon request. In order to secure that data, it is often desirable to encrypt that data before storing it at the server devices. However, there are many concerns with the encrypted storage of data in server devices and other storage systems, which include preventing the server devices from having access to the unencrypted data and/or the encryption keys used to encrypt that data. Furthermore, conventional encryption techniques will generate different encrypted data from the same unencrypted data (e.g., those encryption techniques generate different ciphertext from the same plaintext) due to best practices calling for the use of different initialization vectors by any particular client device for each encryption operation, as well as in situations in which different client devices encrypt the same data with different encryption keys. These best practices for encryption make it impossible, without design changes, for a server device to perform deduplication operations that are often used to eliminate duplicate data storage on the service devices and provide for more efficient use of the storage resources in the server devices. Finally, it may be desirable to enable cryptoshredding of encrypted data stored in server devices, which provides for the destruction of the encrypted data via the destruction of the encryption keys used to encrypt it. Cryptoshredding is one form of data deletion that prevents data from being recoverable by any means, and improves on overwriting data deletion techniques that overwrite data in all locations in which is appears by simply deleting the encryption keys used to encrypt the data rather than identifying the each location in which that data is stored in order to perform the overwriting discussed above.

Accordingly, it would be desirable to provide an encrypted data storage system that allows for the encryption of data with encryption keys that are unknown to server device(s) storing that data, while only requiring the server device(s) to store a single copy of any particular data.

SUMMARY

According to one embodiment, an Information Handling System (IHS) includes a processing system; and a memory system that is coupled to the processing system and that includes instructions that, when executed by the processing system, cause the processing system to provide a client engine that is configured to: perform a hash operation on first data to generate a Data Encryption Key (DEK); perform, using the DEK, a data encryption operation on the first data to generate encrypted first data; perform, using a first Key Encryption Key (KEK), a first key encryption operation on the DEK to generate a first encrypted DEK; associate the first encrypted DEK with the encrypted first data; and transmit, to a storage system for storage, the encrypted first data.

BRIEF DESCRIPTION OF THE DRAWINGS

FIG. 8E is a schematic view illustrating an embodiment of the operation of the networked system of FIG. 2 during the method of FIG. 7.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
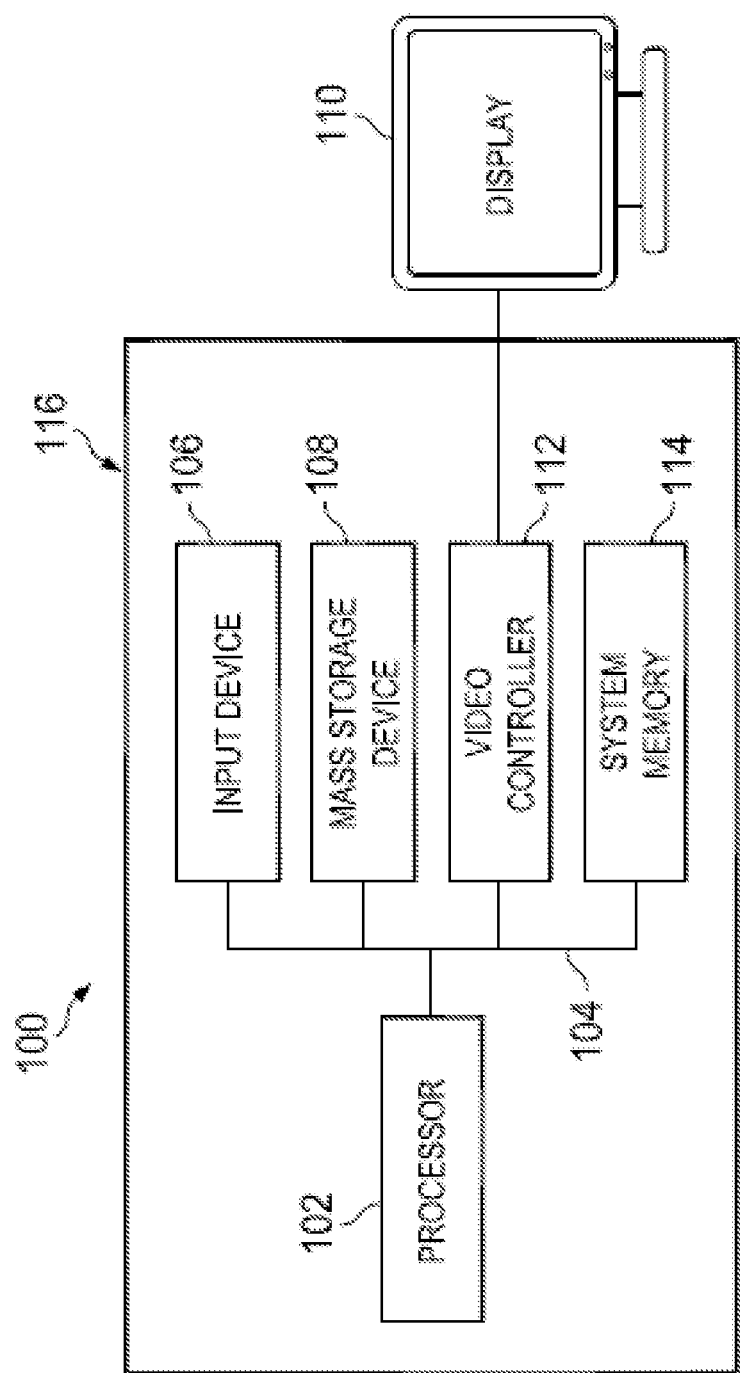
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mice, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
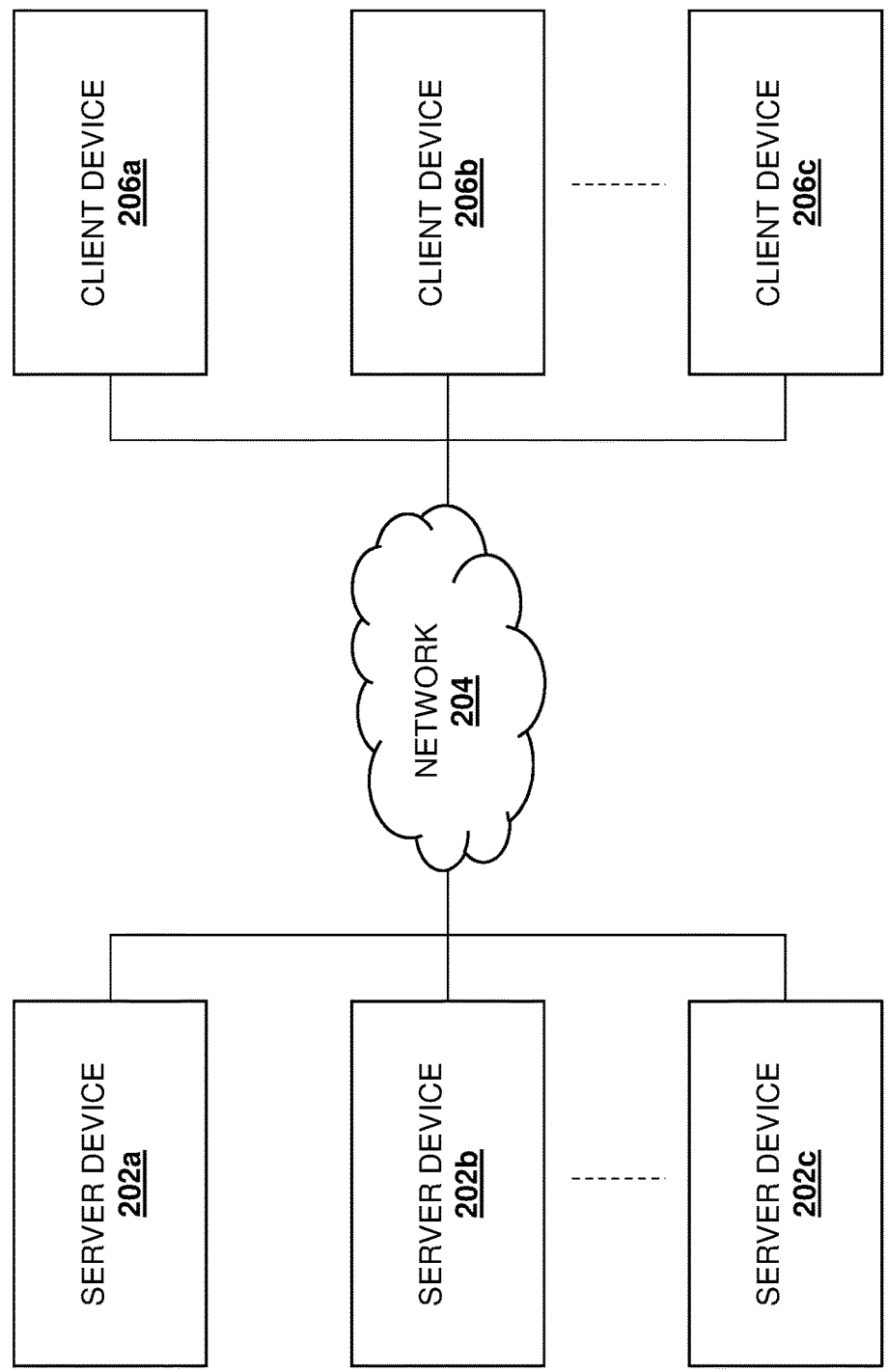
FIG. 2 is a schematic view illustrating an embodiment of a networked system that may utilize the encrypted data storage system of the present disclosure.

Referring now to FIG. 2, an embodiment of a networked system 200 is illustrated. In the illustrated embodiment, the networked system 200 includes a storage system that is illustrated and described below as being provided by a plurality of server devices 202a, 202b, and up to 202c. In an embodiment, the server devices 202a-202c may be provided by the IHS 100 discussed above with reference to FIG. 1, and/or may include some or all of the components of the IHS 100, and in specific examples are configured to perform the server device storage operations discussed below. However, while illustrated and discussed as being provided by server devices, one of skill in the art in possession of the present disclosure will recognize that the storage system provided in the networked system 200 may include any devices that may be configured to operate similarly as the server devices 202a-202c discussed below.

In the illustrated embodiment, each of the server devices 202a-202c is illustrated as coupled to a network 204 that may be provided by a Local Area Network (LAN), the Internet, combinations thereof, and/or other networks that would be apparent to one of skill in the art in possession of the present disclosure. In the illustrated embodiment, a plurality of client devices 206a, 206b, and up to 206c are also coupled to the network 204. In an embodiment, the client devices 206a-206c may be provided by the IHS 100 discussed above with reference to FIG. 1, and/or may include some or all of the components of the IHS 100, and in specific examples are configured to perform the client device storage operations discussed below. However, while illustrated and discussed as being provided by client devices, one of skill in the art in possession of the present disclosure will recognize that client devices provided in the networked system 200 may include any devices that may be configured to operate similarly as the client devices 206a-206c discussed below. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
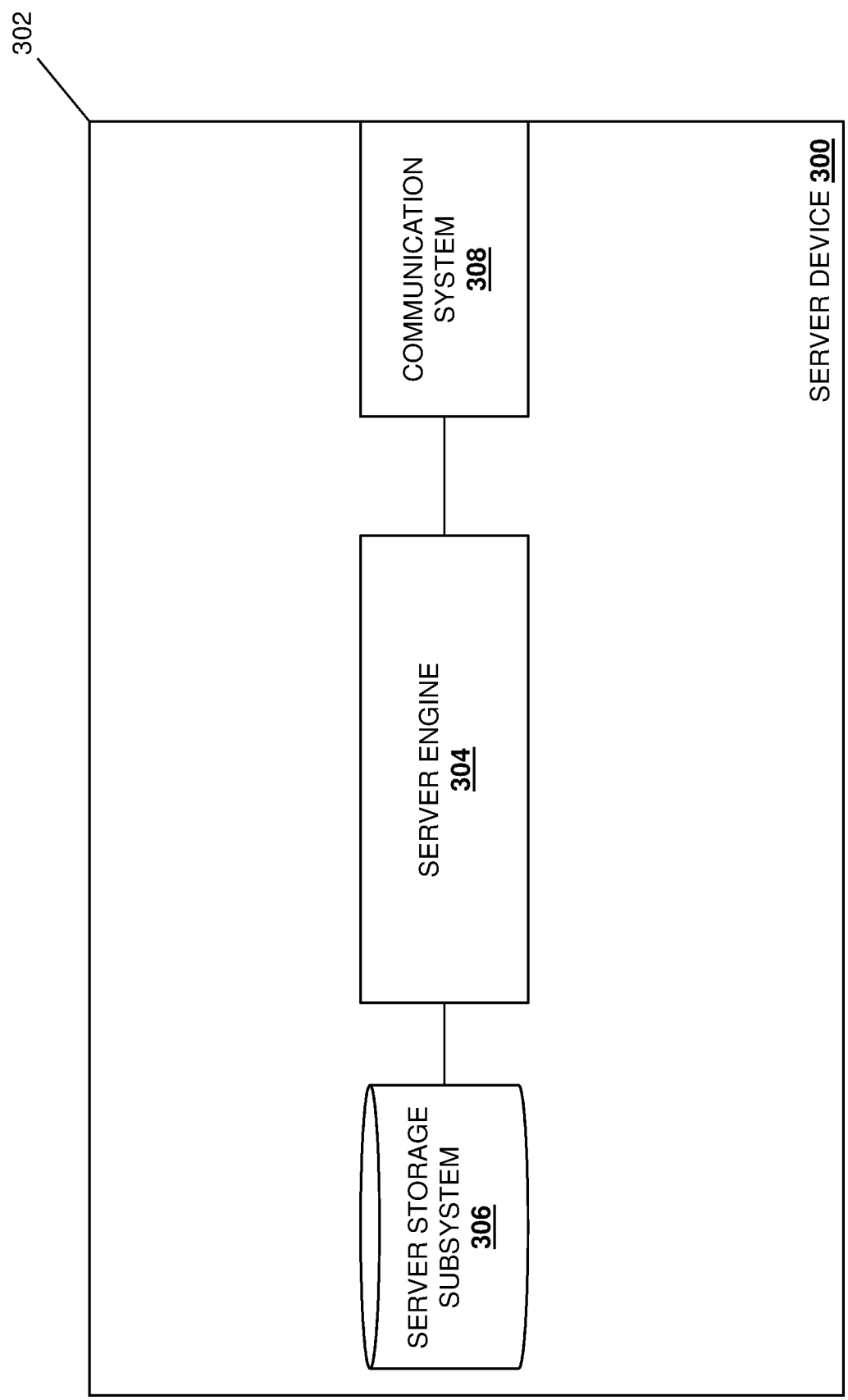
FIG. 3 is a schematic view illustrating an embodiment of a server device that may be provided in the networked system of FIG. 2.

Referring now to FIG. 3, an embodiment of a server device 300 is illustrated that may provide any of all of the server devices 202a-202c discussed above with reference to FIG. 2. As such, the server device 300 may be provided by the IHS 100 discussed above with reference to FIG. 1 and/or may include some or all of the components of the IHS 100, and in specific examples is configured to perform the server device storage operations discussed below. Furthermore, while illustrated and discussed as being provided by a server device, one of skill in the art in possession of the present disclosure will recognize that the functionality of the server device 300 discussed below may be provided by other devices that are configured to operate similarly as the server device 300 discussed below. In the illustrated embodiment, the server device 300 includes a chassis 302 that houses the components of the server device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a server engine 304 that is configured to perform the functionality of the server engines and/or server devices discussed below.

The chassis 302 may also house a server storage subsystem 306 (which may include the storage 108 discussed above with reference to FIG. 1) that is coupled to the server engine 304 (e.g., via a coupling between the server storage subsystem 306 and the processing system) and that is configured to store any of the information utilized by the server engine 304 discussed below. The chassis 302 may also house a communication system 308 that is coupled to the server engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
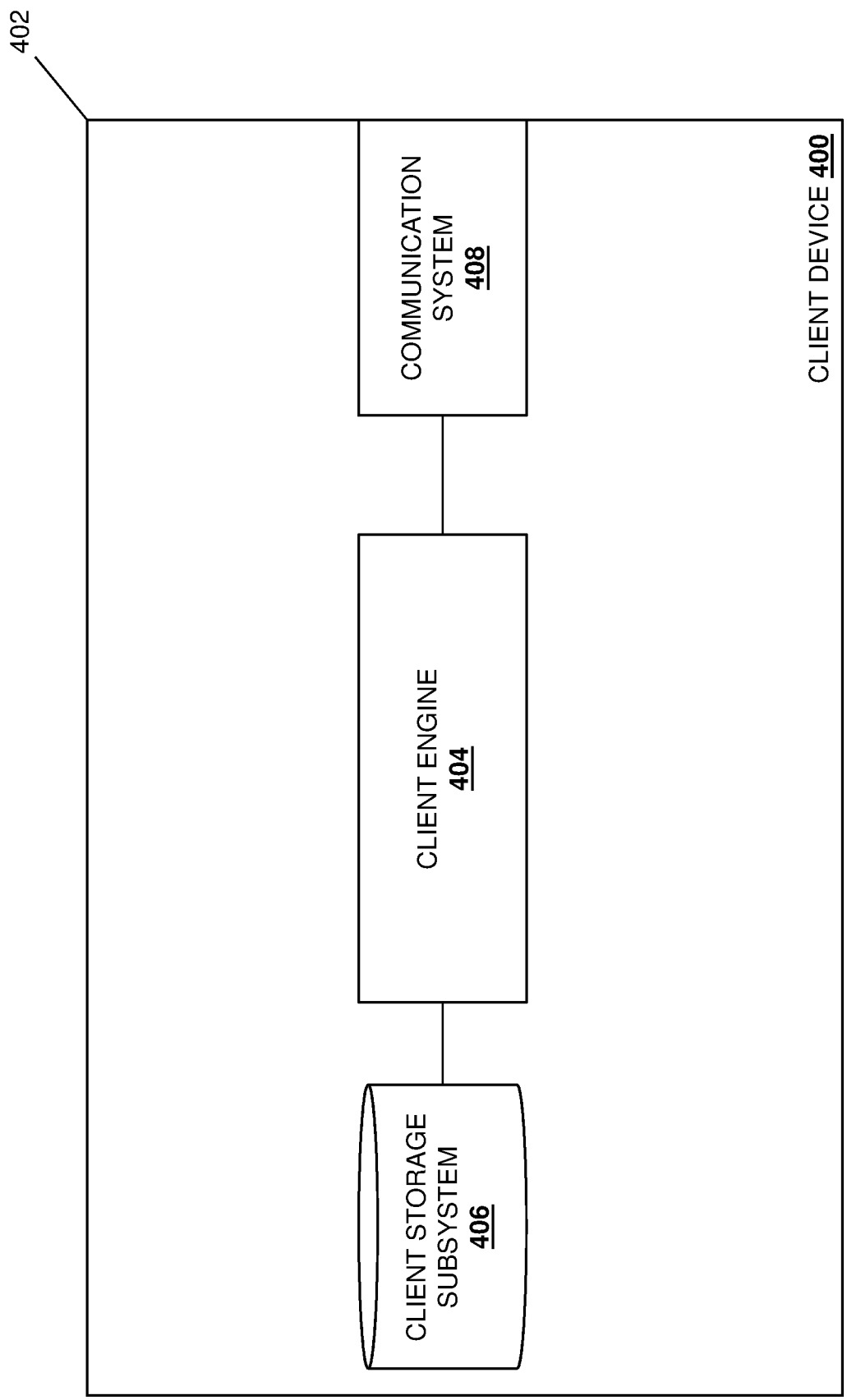
FIG. 4 is a schematic view illustrating an embodiment of a client device that may be provided in the networked system of FIG. 2.

Referring now to FIG. 4, an embodiment of a client device 400 is illustrated that may provide any or all of the client devices 206a-206c discussed above with reference to FIG. 2. As such, the client device 400 may be provided by the IHS 100 discussed above with reference to FIG. 1 and/or may include some or all of the components of the IHS 100, and in specific examples is configured to perform the client device storage operations discussed below. Furthermore, while illustrated and discussed as being provided by a client device, one of skill in the art in possession of the present disclosure will recognize that the functionality of the client device 400 discussed below may be provided by other devices that are configured to operate similarly as the client device 400 discussed below. In the illustrated embodiment, the client device 400 includes a chassis 402 that houses the components of the client device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a client engine 404 that is configured to perform the functionality of the client engines and/or client devices discussed below.

The chassis 402 may also house a client storage subsystem 406 (which may include the storage 108 discussed above with reference to FIG. 1) that is coupled to the client engine 404 (e.g., via a coupling between the client storage subsystem 406 and the processing system) and that is configured to store any of the information utilized by the client engine 404 discussed below. The chassis 402 may also house a communication system 408 that is coupled to the client engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific client device 400 has been illustrated, one of skill in the art in possession of the present disclosure will recognize that client devices (or other devices operating according to the teachings of the present disclosure in a manner similar to that described below for the client device 400) may include a variety of components and/or component configurations for providing conventional client device functionality, as well as the functionality discussed below, while remaining within the scope of the present disclosure as well.

Figure 5:
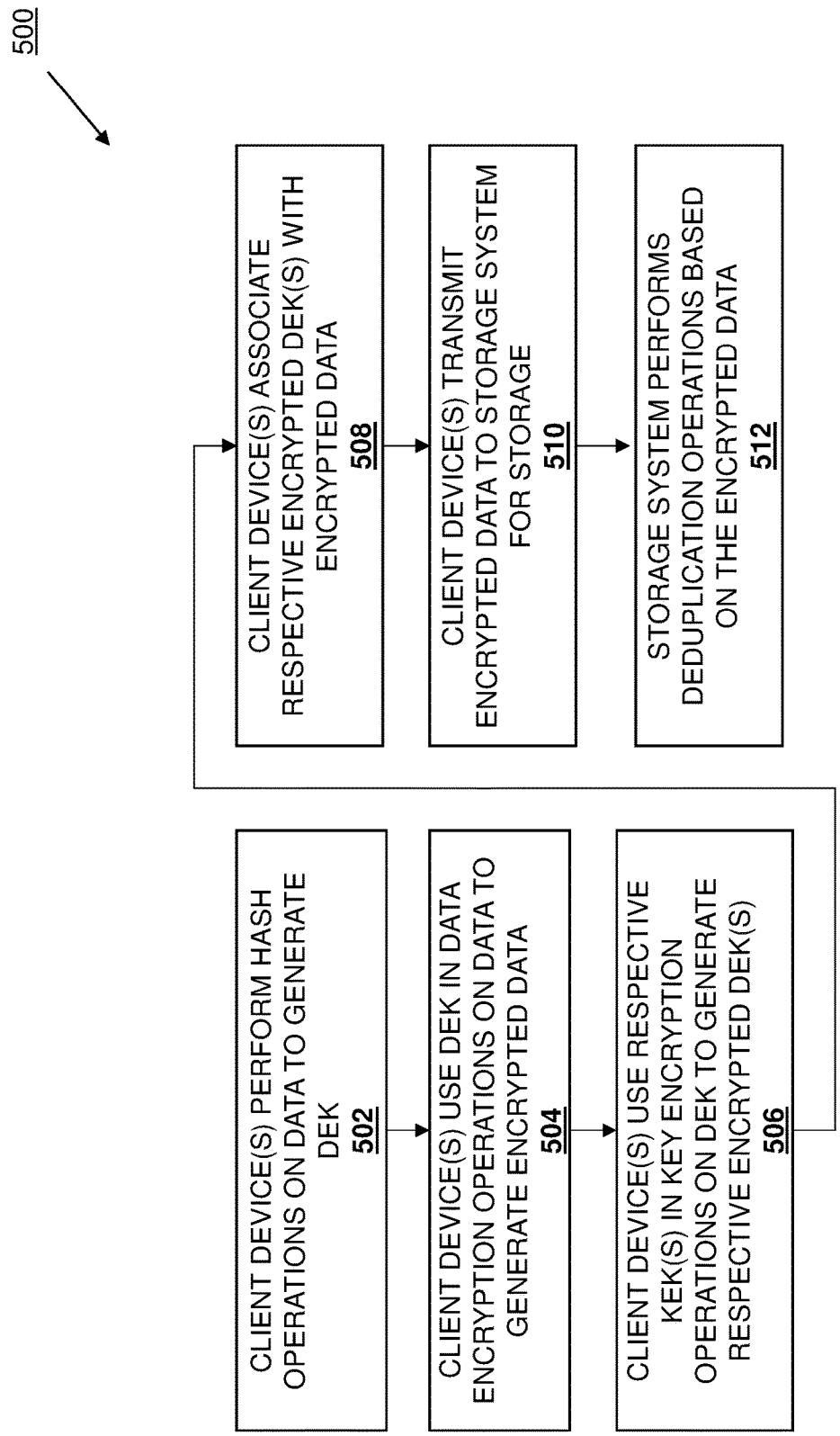
FIG. 5 is a flow chart illustrating an embodiment of a method for storing encrypted data.

Referring now to FIG. 5, an embodiment of a method 500 for storing encrypted data is illustrated. As discussed below, the systems and methods of the present disclosure allow for the encryption of data to generate encrypted data for storage in a storage system in a manner that allows that storage system to perform deduplication operations on that encrypted data without the need for that storage system to have access to the unencrypted data or the encryption keys used to encrypt it. For example, the encrypted data storage system of the present disclosure may include a storage system that is configured to store encrypted data, and client device(s) that are coupled to the storage system. The client device(s) perform hash operations on data to generate a Data Encryption Key (DEK), and use that DEK to perform data encryption operations on the data to generate encrypted data. The client device(s) may then use respective symmetric Key Encryption Keys (KEKs) to perform respective key encryption operations on the DEK to generate respective encrypted DEKs, associate the respective encrypted DEKs with the encrypted data, and transmit the encrypted data to the storage system for storage. The storage system may then perform deduplication operations based on encrypted data received from any client device to ensure that multiple copies of the same encrypted data are not stored in the storage system, and one of skill in the art in possession of the present disclosure will recognize that the performance of the hash operation on data to generate a DEK, and the use of that DEK to perform the data encryption operations on that data to generate the encrypted data, operates to generate identical encrypted data (e.g., identical ciphertext) for the same unencrypted data (e.g., the same plaintext) in order to enable the performance of those deduplication operations by the storage system without access to the unencrypted data or the DEK used to encrypt it.

The method 500 begins at block 502 where client device(s) perform hash operations on data to generate a Data Encryption Key (DEK). In the embodiments discussed below, the data stored via the method 500 is stored as "blocks" of data. For example, the client engine 404 in the client devices 206a-206c/400 may maintain a data structure such as a file system (e.g., in their client storage systems 306), while the storage system provided by the server devices 202a-202c/300 may store data blocks that may be of variable length, and the client engine 404 in the client devices 206a-206c/400 may operate to break files up into data blocks that may be of variable length as well. The client engine 404 in the client devices 206a-206c/400 may then assign each data block a "handle" (e.g., an address in the virtual address space of that client device, or other unique identifier) such that the pair [client device, handle] is unique to each data block. However, while specific block data storage techniques are described herein, one of skill in the art in possession of the present disclosure will appreciate that other data storage techniques for the storage of data may benefit from the teachings of the present disclosure and thus will fall within the scope of the present disclosure as well.

In different embodiments of the method 500, any of the client devices 206a/400, 206b/400, and up to 206c/400 may operate to store data blocks in the storage system provided by the server devices 202a/300, 202b/300, and up to 202c/300. As such, in an embodiment of block 502, the client engine 404 in any client device 400 that is storing a data block according to the method 500 may operate to utilize a hash function (e.g., a Secure Hash Algorithm 256 (SHA- 256) hash function) to perform a hash operation on the data block being stored, which one of skill in the art in possession of the present disclosure will operate to map that data block to a fixed sized value (called a hash result). As such, for any particular data block (e.g., the data block with the plaintext data in the example provided herein), the hash operation performed by the client engine 404 in the client device 400 at block 502 will produce a hash result that, as discussed below, is utilized in the method 500 as a Data Encryption Key (DEK). For example, the client engine 404 in a client device 400 may perform a hash function h(x) on a data block B in order to generate a DEK $K_B$ at block 502 as detailed below:

$$h(B)=K_B$$

Furthermore, one of skill in the art in possession of the present disclosure will recognize that each of the client devices 206a/400, 206b/400, and up to 206c/400 in the networked system 200 may be configured to utilize the same hash function (e.g., the SHA-256 hash function discussed above) such each of those client devices will generate the same DEK for the same data block. For example, the client engine 404 in the client device 206a/400 may store a data block during a first performance of the method 500 that includes performing hash operations on that data block at block 502 to generate a DEK, and may then subsequently attempt to store that same data block (i.e., with identical data) during a second performance of the method 500 by performing hash operations on that data block at block 502 to generate the same DEK as was generated for that data block in its first performance of the method 500.

Similarly, the client engine 404 in the client device 206a/400 may store a data block during a performance of the method 500 that includes performing hash operations on that data block at block 502 to generate a DEK, and the client engine 404 in the client device 206b/400 may then subsequently attempt to store that same data block (i.e., with identical data) during a performance of the method 500 by performing hash operations on that data block at block 502 to generate the same DEK as was generated for that data block by the client device 206a/400 in its performance of the method 500. In other words, client devices 206a-206c in the networked system 200 may be configured to deterministically generate DEKs for the data blocks they are storing in a manner that provides for the generation of the same DEK by different client devices in the event those client devices are attempting to store the same data block with identical plaintext.

In some embodiments of block 502, the client engine 404 in any client device 400 that is storing a data block according to the method 500 may compress that data block before performing the hash operation on the compressed data block to generate the DEK. However, in other embodiments of block 502, the client engine 404 in any client device 400 that is storing a data block according to the method 500 may perform the hash operation on the data block to generate the DEK, and may then compress the data block. As will be appreciated by one of skill in the art in possession of the present disclosure, the hash operations may be performed at block 502 on either compressed data blocks, or uncompressed data blocks (e.g., followed by the compression of those data blocks), as long as each of the client devices 206a-206c in the networked system 200 follow the same hash operation procedure (e.g., all the client devices 206a-206c must either perform hash operations on compressed data block or uncompressed data blocks) so that the same DEK is generated for identical data blocks as discussed above. Furthermore, one of skill in the art in possession of the present disclosure will recognize that while the compression of data blocks may offer significant efficiencies for the storage system, the compression of data blocks in not necessary in the method 500.

In some embodiments of block 502, the client engine 404 in client devices 400 that are storing data blocks according to the method 500 may perform the hash operation discussed above on that data block and a shared secret value (e.g., a deduplication domain permanent shared secret). For example, for client devices in the same deduplication domain (e.g., the client devices 206a-206c in one example), a shared secret value may be provided to each of those client devices (e.g., and stored in their client storage systems 406), and then utilized at block 502 (along with the data block being stored) as an input in the hash function. Continuing with the example provided above, the client engine 404 in a client device 400 may perform a hash function h(x) on a data block B and a shared secret value Q in order to generate a DEK $K_B$ at block 502 as detailed below:

$$h(B,Q)=K_B$$

One of skill in the art in possession of the present disclosure will recognize that the use of the shared secret value in the hash operations performed at block 502 will still result in the generation of the same DEK by different client devices in the event those client devices are attempting to store the same data block/data blocks with identical data as long as those client devices are in the same deduplication domain (i.e., as long as those client devices are using the same shared secret value as part of those hash operations). As discussed below, such shared secret value embodiments limit the ability to guess plaintext blocks based on ciphertext access to client devices in the same deduplication domain.

The method 500 then proceeds to block 504 where the client device(s) use the DEK in data encryption operations on data to generate encrypted data. In an embodiment, at block 504, any client engine 404 in the client device 400 storing a data block according to the method 500 may use the DEK generated at block 502 in order to perform data encryption operations on the data block being stored in order to generate an encrypted data block (i.e., thus encrypting the information included in the data block being stored). Continuing with the example provided above, the client engine 404 in a client device 400 may use the DEK $K_B$ to perform a data encryption operation on the data block B order to generate an encrypted data block $\{B\}K_B$ at block 504. In a specific example, the data encryption operation using the DEK $K_B$ may be performed according to different cryptographic "modes" (e.g., a Cipher Block Chaining (CBC) mode, a Ciphertext Stealing (XTS) mode, a Galois/Counter Mode (GCM), some of which may require a random initialization vector along with the plaintext and the key, and in order to assure that the same plaintext always encrypts to the ciphertext, any such initialization vector should either be a constant or should be pseudo-randomly generated based solely on the plaintext and the key.

Furthermore, one of skill in the art in possession of the present disclosure will recognize that, because a common DEK will be generated for the same data block by different client devices as discussed above, data encryption operations performed on the same data block using a the same DEK by different client devices will generated the same encrypted data block. For example, the client engine 404 in the client device 206a/400 may store a data block during a first performance of the method 500 that includes performing data encryption operations on that data block (e.g., plaintext) at block 504 using a DEK generated by a hash operation performed on that data block in order to generate an encrypted data block (e.g., ciphertext), and may then subsequently attempt to store that same data block (i.e., with identical data) during a second performance of the method 500 by performing the data encryption operations on that data block (e.g., the same plaintext) at block 504 using the same DEK generated by the hash operation performed on that data block in order to generate the same encrypted data block (e.g., the same ciphertext) that was generated during the first performance of the method 500.

Similarly, the client engine 404 in the client device 206a/400 may store a data block during a performance of the method 500 that includes performing data encryption operations on that data block (e.g., plaintext) at block 504 using a DEK generated by a hash operation performed on that data block in order to generate an encrypted data block (e.g., ciphertext), and the client engine 404 in the client device 206b/400 may then subsequently attempt to store that same data block (i.e., with identical data) during a performance of the method 500 by performing the data encryption operations on that data block (e.g., the same plaintext) at block 504 using the same DEK generated by the hash operation performed on that data block in order to generate the same encrypted data block (e.g., the same ciphertext) that was generated for that data block by the client device 206a/400 in its performance of the method 500. In other words, client devices 206a-206c in the networked system 200 may be configured to generate identical encrypted data for the data blocks they are storing in a manner that provides for the generation of the same encrypted data (e.g., identical ciphertext) by different client devices in the event those client devices are attempting to store the same data block/data blocks with identical data (e.g., identical plaintext).

As discussed above, a shared secret value may be used along with the data block by the client devices in the hash operations performed at block 502 in order to limit the ability to guess plaintext blocks based on ciphertext access to client devices in the same deduplication domain. For example, without the shared secret value discussed above, a client device could be used to guess a data block (e.g., plaintext), perform the hash operation on that data block to generate a DEK, and encrypt the guessed data block using that DEK to generate a guessed encrypted data block (e.g., guessed ciphertext). That guessed encrypted data block could then be used to search the storage system for a match, thus identifying instances of the guessed data block (e.g., guessed plaintext). As such, providing the shared secret value to client devices in the same deduplication domain will limit the ability to perform such "plaintext" guessing attacks to the client devices in that deduplication domain, and the "rollover" or replacement of such a shared secret value will simply prevent the deduplication operations discussed below without causing any data loss or confusion on how to decrypt the encrypted data block.

The method 500 then proceeds to block 506 where the client device(s) use respective Key Encryption Keys (KEKs) in key encryption operations on the DEK to generate respective encrypted DEK(s). In an embodiment, at block 506, the client engine 404 in any client device 206a-206c/400 storing a block data according to the method 500 may perform key encryption operations on the DEK generated for that data block using one or more Key Encryption Keys (KEKs). As will be appreciated by one of skill in the art in possession of the present disclosure, any of the KEKs discussed herein may be retrieved from a KEK system (e.g., a server system operating according to the Key Management Interoperability Protocol (KMIP) and or other key management system known in the art). For example, each client device 206a-206c/400 may store a respective KEK that is unique to that client device and that may be utilized to generate a respective encrypted DEK for each client device 206a-206c/400 that is different than the encrypted DEKs generated by the other client devices. In a specific example, the client device 206a/400 may store a KEK $S_a$ in its client storage subsystem 406, the client device 206b/400 may store a KEK $S_b$ in its client storage subsystem 406, and the client device 206c/400 may store a KEK $S_c$ in its client storage subsystem 406, with KEKs $S_a$, $S_b$, and $S_c$ all being different KEKs. As such, any DEK $K_B$ generated for the same data block B by the client devices 206a-206c/400 may be encrypted by the client engine 404 in the client device 206a/400 using the KEK $S_a$ to generate an encrypted DEK $\{K_B\}S_a$, encrypted by the client engine 404 in the client device 206b/400 using the KEK $S_b$ to generate an encrypted DEK $\{K_B\}S_b$, and encrypted by the client engine 404 in the client device 206c/400 using the KEK $S_c$ to generate an encrypted DEK $\{K_B\}S_c$, and one of skill in the art in possession of the present disclosure will recognize how the encrypted DEKs $\{K_B\}S_a$, $\{K_B\}S_b$, and $\{K_B\}S_c$ are different from each other due to the different KEKs $S_a$, $S_b$, and $S_c$ used to encrypt them.

In another example, one or more of the client devices 206a/400, 206b/400, and up to 206c/400 may store a common KEK that may be utilized to generate a common encrypted DEK for those client devices 206a-206c/400. For example, as discussed in further detail below, a time-based KEK may be utilized by one of more of the client devices 206a/400, 206b/400, and up to 206c/400 in order to provide an expiration date for that KEK (and the encrypted DEK/encrypted data block it is utilized with). In a specific example, one or more of the client devices 206a/400, 206b/400, and up to 206c/400 may store a time-based KEK $S_{Mar2022}$ that, in this example, is configured to expire in March of 2022, but one of skill in the art in possession of the present disclosure will appreciate that the time-based KEKs of the present disclosure may be configured to expire at any time while remaining within the scope of the present disclosure as well. As such, any DEK $K_B$ generated for the same data block B by one or more of the client devices 206a/400, 206b/400, and up to 206c/400 may be encrypted by the client engine 404 in those client devices using the KEK $S_{Mar2022}$ to generate an encrypted DEK $\{K_B\}S_{Mar2022}$.

In another example, any client device 206a-206c/400 may store KEKs that are unique to subsets of data in that client device, and that may be utilized to generate respective encrypted DEKs for those subsets of data that are different than the encrypted DEKs generated for the other subsets of data. In a specific example, the client device 206a/400 may store a KEK $S_{a\text{-}folder\text{-}1}$ in its client storage subsystem 406, the client device 206a/400 may store a KEK $S_{a\text{-}folder\text{-}2}$ in its client storage subsystem 406, and the client device 206a/400 may store up to a KEK $S_{a\text{-}folder\text{-}n}$ in its client storage subsystem 406, with KEKs $S_{a\text{-}folder\text{-}1}$, $S_{a\text{-}folder\text{-}2}$, and up to $S_{a\text{-}folder\text{-}n}$ all being different KEKs. As such, the client engine 404 in the client device 206a/400 may encrypt a DEK $K_{B\text{-}a\text{-}folder\text{-}1}$ generated for data in "folder-1" in that client device 206a/400 using the KEK $S_{a\text{-}folder\text{-}1}$ to generate an encrypted DEK $\{K_{B\text{-}a\text{-}folder\text{-}1}\}S_{a\text{-}folder\text{-}1}$, may encrypt a DEK $K_{B\text{-}a\text{-}folder\text{-}2}$ generated for data in "folder-2" in that client device 206a/400 using the KEK $S_{a\text{-}folder\text{-}2}$ to generate an encrypted DEK $\{K_{B\text{-}a\text{-}folder\text{-}2}\}S_{a\text{-}folder\text{-}2}$, and may encrypt a DEK $K_{B\text{-}a\text{-}folder\text{-}n}$ generated for data in "folder-n" in that client device 206a/400 using the KEK $S_{a\text{-}folder\text{-}n}$ to generate an encrypted DEK $\{K_{B\text{-}a\text{-}folder\text{-}n}\}S_{a\text{-}folder\text{-}n}$. However, while specific examples of client device specific KEKs, time-based KEKs, and data subset KEKs (e.g., folders KEKs in the specific example above) have been described, one of skill in the art in possession of the present disclosure will recognize that a variety of other types of KEKs will fall within the scope of the present disclosure as well.

Furthermore, in some embodiments, client devices 206a-206c/400 may utilize KEKs in combination in order to encrypt a DEK at block 506. For example, a client engine 404 in the client device 400 may generate a KEK for use in encrypting a DEK via a plurality of the KEKs discussed above. For example, the client engine 404 in the client device 206a/400 may generate a KEK ($S_a$ or $S_{Mar2022}$) by performing an XOR operation on the KEK $S_a$ and the KEK $S_{Mar2022}$ discussed above, which as discussed in further detail below may allow encrypted data associated with the KEK ($S_a$ or $S_{Mar2022}$) to be cryptoshredded based on the identity of the client device 206a, or on an expiration date (e.g., March 2022 in this specific example). However, while the use of an XOR operation to combine KEKs has been described, one of skill in the art in possession of the present disclosure will appreciate that the XOR operation discussed above may be replaced with any calculation (e.g., a hash calculation using the KEKs, an addition calculation using the KEKs, etc.) that provides a result that cannot be calculated without knowing the KEKs while remaining within the scope of the present disclosure as well.

In another example, the client engine 404 in the client device 206a/400 may use multiple KEKs to encrypt a DEK by encrypting that DEK with the KEK $S_a$ to generate an encrypted DEK $\{K_B\}S_a$, and encrypting that DEK with the KEK $S_{Mar2022}$ to generate an encrypted DEK $\{K_B\}S_{Mar2022}$, which as discussed in further detail below may allow encrypted data associated with the KEK $S_a$ and the KEK $S_{Mar2022}$ to be cryptoshredded based on the identity of the client device 206a and on an expiration date (e.g., March 2022 in this specific example). However, while a few specific examples are provided, one of skill in the art in possession of the present disclosure will appreciate that any number of any types of KEKs may be utilized to encrypt a DEK at block 506 while remaining within the scope of the present disclosure as well.

As discussed above, the KEKs utilized by the client devices at block 506 may be symmetric KEKs. One of skill in the art in possession of the present disclosure will recognize that symmetric KEKs may provide advantages over asymmetric KEKs due to their smaller size (which results in smaller encrypted DEKs), relatively more efficient calculation operations, and/or other advantages that would be apparent to one of skill in the art in possession of the present disclosure. However, while the use of symmetric KEKs is discussed herein, one of skill in the art in possession of the present disclosure will recognize that the use of asymmetric KEKs may fall within the scope of the present disclosure in some embodiments as well.

Thus, different KEKs used by a particular client device or multiple client devices may be associated with different data classes such as, for example, a client device data class that includes any data stored by a particular client device, a time-based data class that includes any data stored during a particular time period, a location-based data class (e.g., a folder-based data class in the examples above) that includes any data associated with a particular data location (e.g., a particular folder within a client device), and/or other data classes that would be apparent to one of skill in the art in possession of the present disclosure. As discussed below, the use of KEKs associated with different data classes allows for the cryptoshredding of data belonging to any particular data class via the deletion of the KEK associated with that data class by the client device(s) that stored that data.

The method 500 then proceeds to block 508 where the client device(s) associate the respective encrypted DEK(s) with the encrypted data. In an embodiment, at block 508, the client engine 404 in any client device 400 storing data according to the method 500 may operate to associate the encrypted DEK generated at block 506 with the encrypted data block generated at block 504. In some embodiments, the association of the encrypted DEK with the encrypted data block at block 508 may include providing the encrypted DEK as metadata with the encrypted data block. Continuing with the specific example provided above where the client engine 404 in the client device 206a/400 generated the encrypted data block $\{B\}K_B$ at block 504 and the encrypted DEK $\{K_B\}S_a$ at block 506, the client engine 404 in the client device 206a/400 may associate the encrypted DEK $\{K_B\}S_a$ with the encrypted data block $\{B\}K_B$ by providing the encrypted DEK $\{K_B\}S_a$ as metadata for the encrypted data block $\{B\}K_B$. Furthermore, for the same data block, the client engine 404 in the client device 206b/400 may associate the encrypted DEK $\{K_B\}S_b$ it generated at block 506 with the encrypted data block $\{B\}K_B$ it generated at block 504 by providing the encrypted DEK $\{K_B\}S_b$ as metadata for the encrypted data block $\{B\}K_B$, and the client engine 404 in the client device 206c/400 may associate the encrypted DEK $\{K_B\}S_c$, it generated at block 506 with the encrypted data block $\{B\}K_B$ it generated at block 504 by providing the encrypted DEK $\{K_B\}S_c$, as metadata for the encrypted data block $\{B\}K_B$.

In other embodiments, the association of the encrypted DEK with the encrypted data block at block 508 may include associating the encrypted DEK with the encrypted data block in a client storage subsystem in a client device. Continuing with the specific example provided above where the client engine 404 in the client device 206a/400 generated the encrypted data block $\{B\}K_B$ at block 504 and the encrypted DEK $\{K_B\}S_a$ at block 506, the client engine 404 in the client device 206a/400 may associate the encrypted DEK $\{K_B\}S_a$ with the encrypted data block $\{B\}K_B$ in its client storage subsystem 406. Furthermore, for the same data block, the client engine 404 in the client device 206b/400 may associate the encrypted DEK $\{K_B\}S_b$ it generated at block 506 with the encrypted data block $\{B\}K_B$ it generated at block 504 in its client storage subsystem 406, and the client engine 404 in the client device 206c/400 may associate the encrypted DEK $\{K_B\}S_c$, it generated at block 506 with the encrypted data block $\{B\}K_B$ it generated at block 504 in its client storage subsystem 406.

Figure 6A:
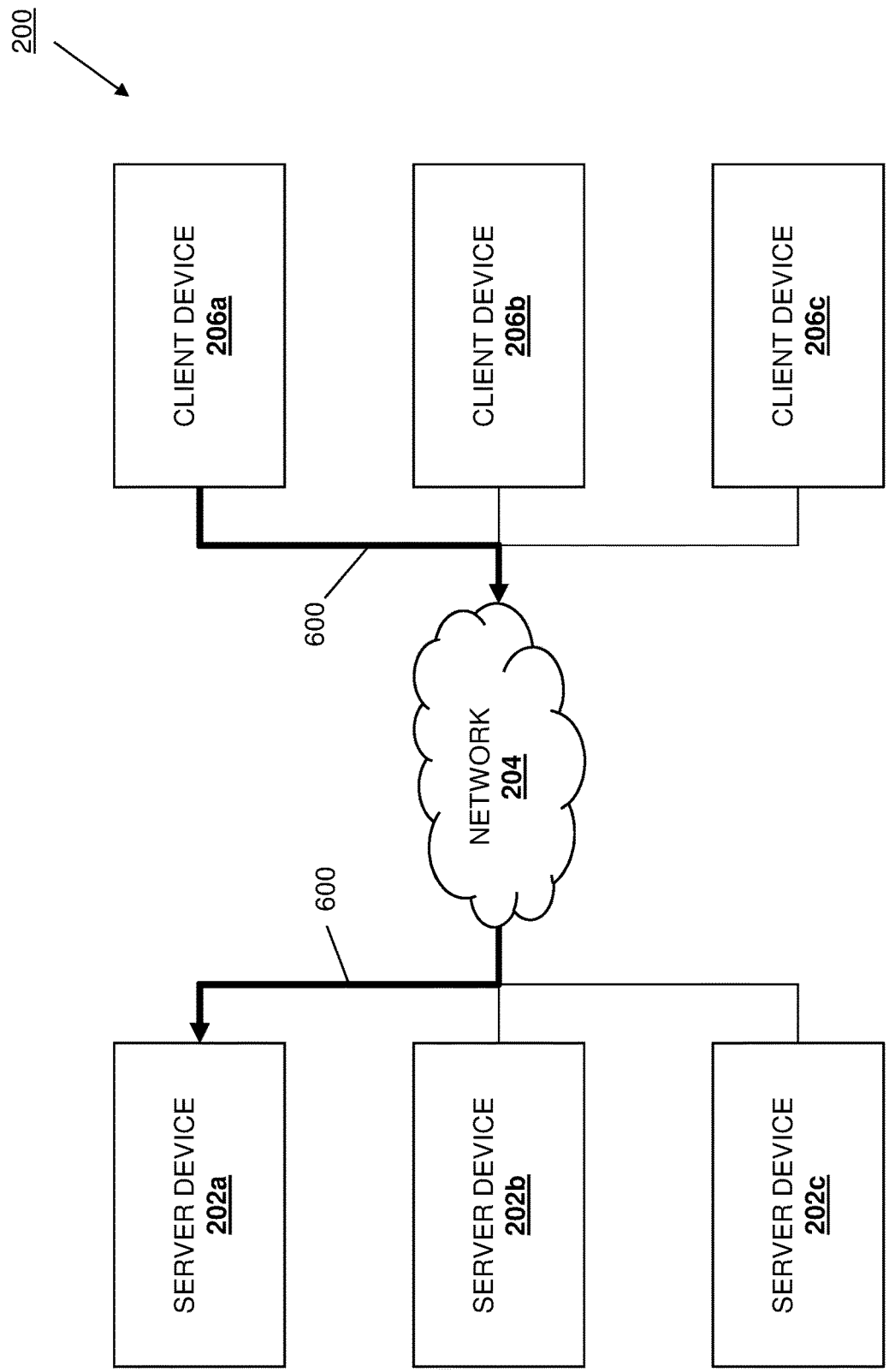
FIG. 6A is a schematic view illustrating an embodiment of the operation of the networked system of FIG. 2 during the method of FIG. 5.
Figure 6B:
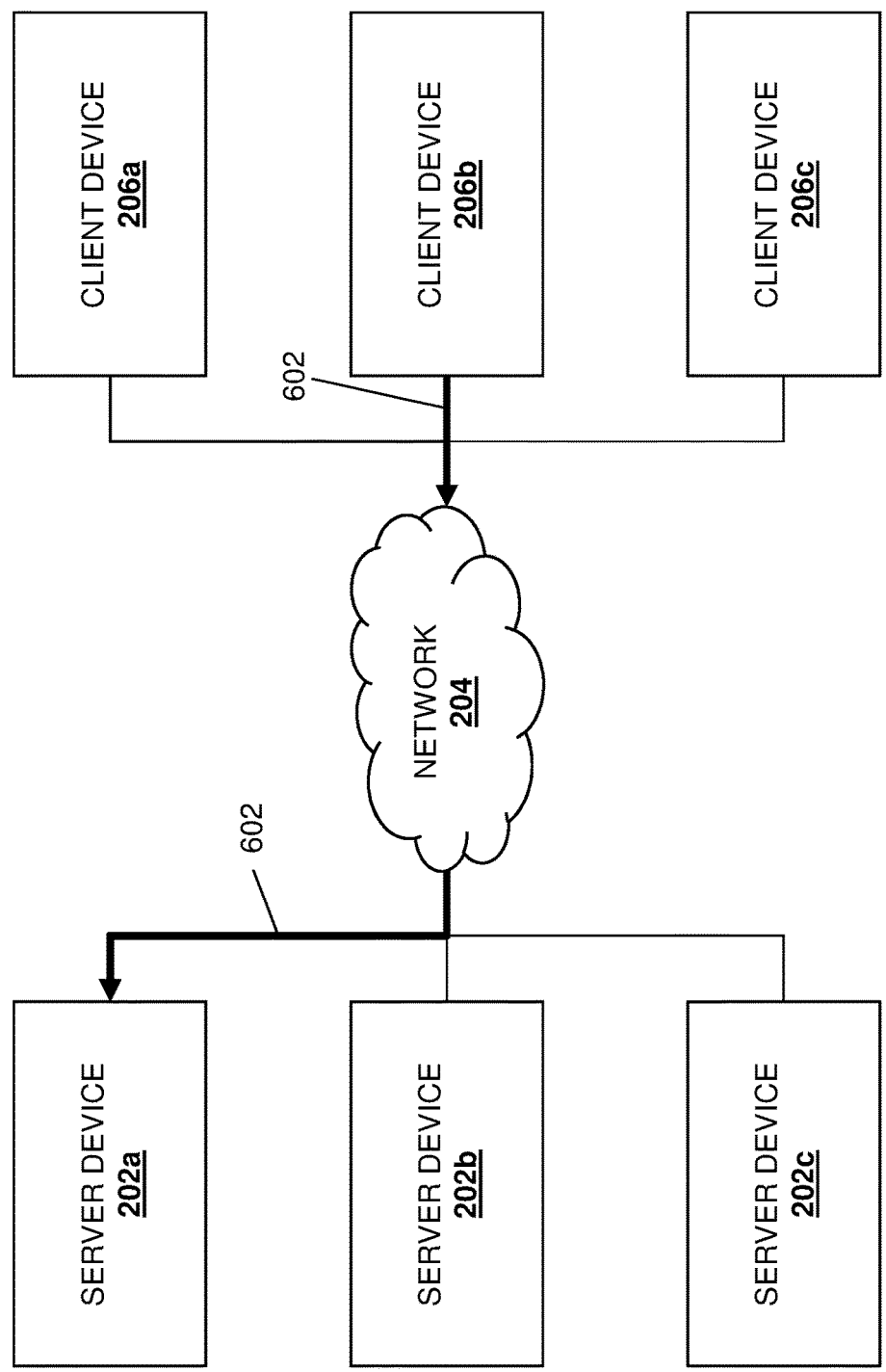
FIG. 6B is a schematic view illustrating an embodiment of the operation of the networked system of FIG. 2 during the method of FIG. 5.
Figure 6C:
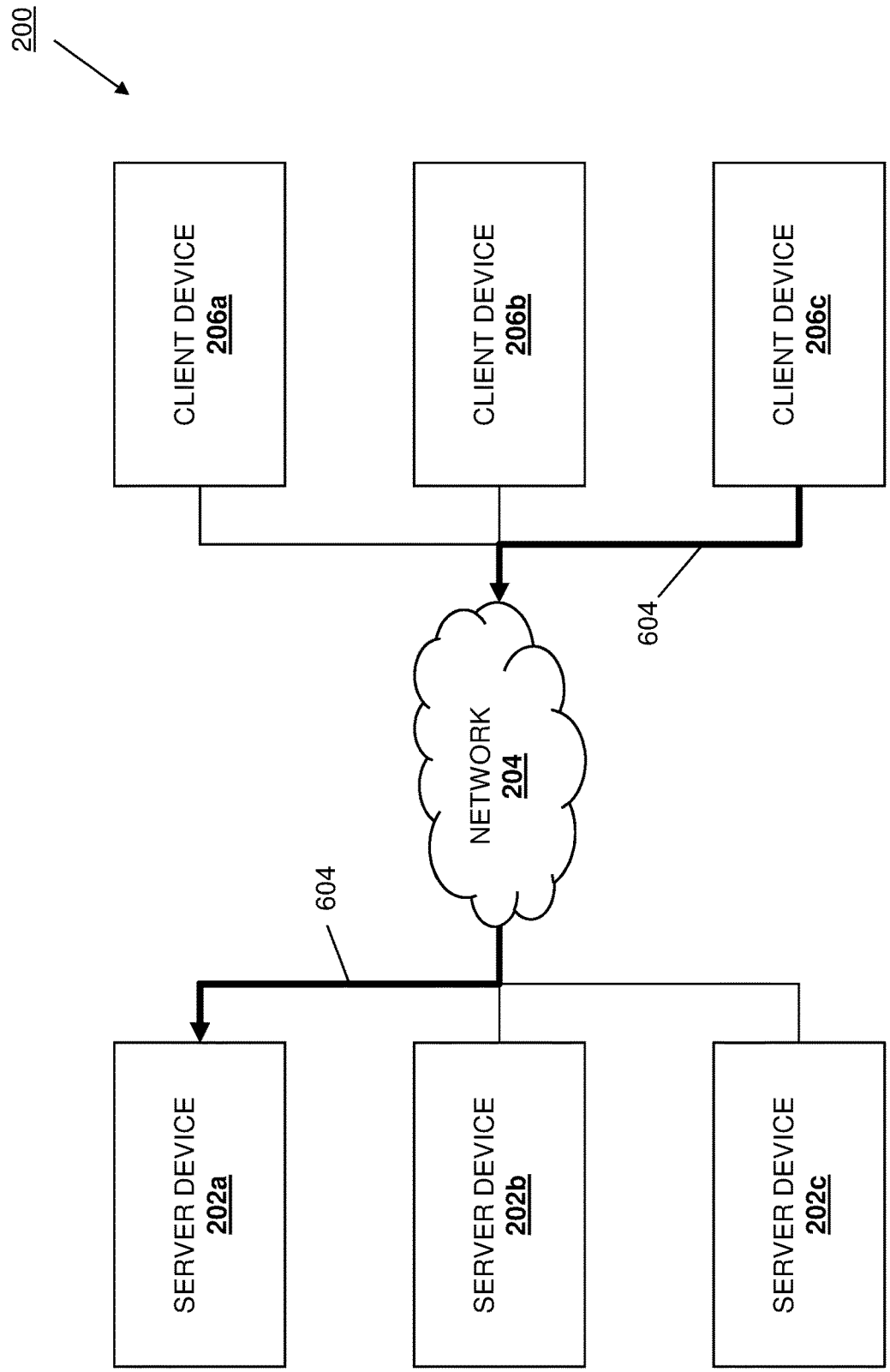
FIG. 6C is a schematic view illustrating an embodiment of the operation of the networked system of FIG. 2 during the method of FIG. 5.

The method 500 then proceeds to block 510 where the client device(s) transmit the encrypted data to a storage system for storage. In an embodiment, at block 510, the client engine 404 in any client device 400 storing data according to the method 500 may operate to transmit the encrypted data block generated at block 504 to the storage system for storage (e.g., a write operation). For example, FIG. 6A illustrates how the client engine 404 in the client device 206a/400 may perform encrypted data block storage operations 600 that include transmitting the encrypted data block it generated at block 504 via the network 204 to the server device 202a. Similarly, FIG. 6B illustrates how the client engine 404 in the client device 206b/400 may perform encrypted data block storage operations 602 that include transmitting the encrypted data block it generated at block 504 via the network 204 to the server device 202a, and FIG.

6C illustrates how the client engine 404 in the client device 206c/400 may perform encrypted data block storage operations 604 that include transmitting the encrypted data block it generated at block 504 via the network 204 to the server device 202a. Furthermore, while the illustrated example describes all encrypted data blocks as being transmitted to the server device 202a for storage, one of skill in the art in possession of the present disclosure will appreciate that encrypted data blocks may be transmitted to any of the server devices 202b and up to 202c while remaining within the scope of the present disclosure as well.

In embodiments in which the association of the encrypted DEK with the encrypted data block at block 508 includes providing the encrypted DEK as metadata with the encrypted data block, any client engine 404 transmitting encrypted data to the storage system at block 510 may have assigned a handle (e.g., an address in the virtual address space of that client device, or other unique identifier) to the data block as discussed above such that the pair [client device, handle] is unique to that data block, and at block 510 may transmit the handle associated with that data block, the encrypted data block (e.g., ciphertext) generated for that data block, and the encrypted DEK associated with that data block as metadata, to the storage system. Continuing with the specific example above, at block 510 the client engine 404 in the client device 202a/400 storing a data block B according to the method 500 may transmit the handle generated for that data block B, the encrypted data block $\{B\}K_B$, and the encrypted DEK $\{K_B\}S_a$ as metadata, to the server device 202a. Similarly, at block 510 the client engine 404 in the client device 202b/400 storing the data block B according to the method 500 may transmit the handle generated for that data block B, the encrypted data block $\{B\}K_B$, and the encrypted DEK $\{K_B\}S_b$ as metadata, to the server device 202a; and the client engine 404 in the client device 202c/400 storing the data block B according to the method 500 may transmit the handle generated for that data block B, the encrypted data block $\{B\}K_B$, and the encrypted DEK $\{K_B\}S_c$ as metadata, to the server device 202a.

In embodiments in which the association of the encrypted DEK with the encrypted data block at block 508 includes associating the encrypted DEK with the encrypted data block in the client storage subsystem of the client device storing that data block, any client engine 404 transmitting encrypted data to the storage system at block 510 may have assigned a handle (e.g., an address in the virtual address space of that client device, or other unique identifier) to the data block as discussed above such that the pair [client device, handle] is unique to that data block, and at block 510 may transmit the handle associated with that data block and the encrypted data block (e.g., ciphertext) generated for that data block to the storage system. Continuing with the specific example above, at block 510 the client engine 404 in the client device 202a/400 storing a data block B according to the method 500 may transmit the handle generated for that data block B and the encrypted data block $\{B\}K_B$ to the server device 202a. Similarly, at block 510 the client engine 404 in the client device 202b/400 storing the data block B according to the method 500 may transmit the handle generated for that data block B and the encrypted data block $\{B\}K_B$ to the server device 202a, and the client engine 404 in the client device 202c/400 storing the data block B according to the method 500 may transmit the handle generated for that data block B and the encrypted data block $\{B\}K_B$ to the server device 202a.

In embodiments in which client devices utilize KEKs in combination in order to encrypt a DEK, block 510 may include the client engine in those client devices providing KEK descriptors along with the encrypted DEK. Continuing with the example provided above in which the client device 206a/400 generated a KEK ($S_a$ or $S_{Mar2022}$) by performing an XOR operation on the KEK $S_a$ and the KEK $S_{Mar2022}$, at block 508 the client engine 404 in the client device 206a/400 may provide a KEK descriptor such as, for example, "requires client-specific-KEK and March2022-KEK to decrypt" (i.e., along with the handle, the encrypted data block $\{B\}K_B$, and the encrypted DEK $\{K_B\}$ ($S_a$ or $S_{Mar2022}$) transmitted to the server device 202a; or in association with the encrypted data block $\{B\}K_B$ and the encrypted DEK $\{K_B\}$ ($S_a$ or $S_{Mar2022}$) in its client storage subsystem 406). Similarly, continuing with the example provided above in which the client device 206a/400 used multiple KEKs to encrypt a DEK by encrypting that DEK with the KEK $S_a$ to generate an encrypted DEK $\{K_B\}S_a$, and encrypting that DEK with the KEK $S_{Mar2022}$ to generate an encrypted DEK $\{K_B\}S_{Mar2022}$, at block 508 the client engine 404 in the client device 206a/400 may provide a KEK descriptor such as, for example, "requires client-specific-KEK or March2022-KEK to decrypt" (i.e., along with the handle, the encrypted data $\{B\}K_B$, the encrypted DEK $\{K_B\}$ $S_a$, and the encrypted DEK $\{K_B\}$ $S_{Mar2022}$, or in association with the encrypted data block $\{B\}K_B$, the encrypted data $\{B\}K_B$, the encrypted DEK $\{K_B\}$ $S_a$, and the encrypted DEK $\{K_B\}$ $S_{Mar2022}$ in its client storage subsystem 406). As will be appreciated by one of skill in the art in possession of the present disclosure, the server engine 302 in the server device 202a/300 will not interpret such KEK descriptors, and will simply store them in the client block list associated with the client device from which they were received (as well as return them to client devices in response to a read request, discussed in further detail below).

The method 500 then proceeds to block 512 where the storage system performs deduplication operations based on the encrypted data. In an embodiment, at block 512, the storage system provided by the server devices 202a, 202b, and up to 202c in this example may receive any encrypted data blocks transmitted by the client device(s) 206a, 206b, and up to 206c at block 510, and perform deduplication operations on the encrypted data blocks. As will be appreciated by one of skill in the art in possession of the present disclosure, when an encrypted data block is received that is not currently stored in the storage system, deduplication operations performed by the storage system will store that received encrypted data block in the storage system, while when an encrypted data block is received that is identical to an encrypted data block that is currently stored in the storage system, deduplication operations performed by the storage system will not store that received encrypted data block in the storage system (i.e., because an identical copy of the data in that received data block is already stored in the storage system).

As will be appreciated by one of skill in the art in possession of the present disclosure, a storage system receiving a handle and encrypted data block from a client device may operate to perform a hash operation on that encrypted data block to generate a deduplication identifier for that encrypted data block. The storage system may then add that handle/deduplication identifier combination to a client block list for that client device in the storage system in order to associate the handle (which the client device uses to uniquely identify the encrypted data block) and the deduplication identifier with that client device. As such, each client device that transmits an encrypted data block to the storage system will have the handle and a deduplication identifier for that encrypted data block added to its client block list in the storage system. Furthermore, when an encrypted data block is received by the storage system that is not currently stored in the storage system, the storage system will operate to store that received encrypted data block at a storage location in the storage system, and associate that storage location and the deduplication identifier for that received encrypted data block in a deduplication table that may be stored in the storage system. As such, when an encrypted data block is received by the storage system that is identical to an encrypted data block that is currently stored in the storage system, the storage system may generate the deduplication identifier for that received encrypted data block, determine that deduplication identifier is already included in the deduplication table stored in the storage system and, in response, determine that the received encrypted data block does not need to be written to the storage system.

For example, assume the encrypted data block $\{B\}K_B$ transmitted by the client device 206a at block 510 is not currently stored in the storage device 202a (or the storage devices 202b and up to 202c in some examples). In response to receiving the encrypted data block $\{B\}K_B$ and associated handle from the client device 206a, the server engine 304 in the server device 202a/300 may operate to perform a hash operation on that encrypted data block $\{B\}K_B$ to generate a deduplication identifier for that encrypted data block $\{B\}K_B$, and add that handle/deduplication identifier combination to a client block list for the client device 206a in its server storage subsystem 306 in order to associate the handle (which the client device 206a uses to uniquely identify the encrypted data block $\{B\}K_B$) and the deduplication identifier with that client device 206a. Furthermore, the server engine 304 in the server device 202a/300 may then operate to store that encrypted data block $\{B\}K_B$ at a storage location in its server storage subsystem 306, and associate that storage location and the deduplication identifier for that received encrypted data block $\{B\}K_B$ in a deduplication table that may be stored in the server storage subsystem 306.

Continuing with this example, assume the encrypted data block $\{B\}K_B$ transmitted by the client device 206b at block 510 is identical to an encrypted data block $\{B\}K_B$ that is currently stored in the storage device 202a (or the storage devices 202b and up to 202c in some examples). In response to receiving the encrypted data block $\{B\}K_B$ and associated handle from the client device 206b, the server engine 304 in the server device 202a/300 may operate to perform a hash operation on that encrypted data block $\{B\}K_B$ to generate a deduplication identifier for that encrypted data block $\{B\}K_B$, and add that handle/deduplication identifier combination to a client block list for the client device 206b in its server storage subsystem 306 in order to associate the handle (which the client device 206b uses to uniquely identify the received encrypted data block $\{B\}K_B$) and the deduplication identifier with that client device 206b.

Furthermore, the server engine 304 in the server device 202a/300 may then determine that the deduplication identifier for the encrypted data block $\{B\}K_B$ received from the client device 206b at block 510 is already included in the deduplication table stored in its server storage subsystem 306 and, in response, determine that received encrypted data block $\{B\}K_B$ does not need to be written to the server storage subsystem 306. As discussed above, the generation of the encrypted data blocks by the client devices 206a-206c using the DEK that is deterministically generated from the data block being encrypted produced encrypted data blocks (e.g., ciphertext) that are identical when the same data block (e.g., the same plaintext) is encrypted. Thus, the deduplication operations performed at block 512 prevent multiple copies of identical encrypted data blocks from being stored in the storage system/server devices 202a-202c with the need for the storage system/server devices 202a-202c to access unencrypted data blocks (e.g., the plaintext that was encrypted) or the encryption key (e.g., the DEK) used to encrypt it. While the storage system has been described as performing deduplication operations to prevent a second client device from storing an encrypted data block in the storage system that is identical to an encrypted data block that was previously stored in the storage system by a first client device, one of skill in the art in possession of the present disclosure will appreciate that the storage system may perform deduplication operations to prevent a client device from storing an encrypted data block in the storage system that is identical to an encrypted data block that it previously stored in the storage system while remaining within the scope of the present disclosure as well.

In embodiments in which the client engine 404 in the client device 400 transmits the encrypted DEK along with the encrypted data block and associated handle at block 510, the server engine 304 in the server device 202a/300 may operate to store that encrypted DEK in the client block list for that client device. Continuing with the example above in which the client device 206a transmits the handle generated for a data block B, an encrypted data block $\{B\}K_B$, and an encrypted DEK $\{K_B\}S_a$ to the server device 202a at block 510, the server engine 304 in the server device 202a/300 may generate the deduplication identifier for the encrypted data block $\{B\}K_B$, and add the handle/deduplication identifier/encrypted DEK $\{K_B\}S_a$ combination to the client block list for the client device 206a. However, in the example above in which the client device 206a transmits the handle generated for a data block B and an encrypted data block $\{B\}K_B$ to the server device 202a at block 510 (e.g., and does not transmit the encrypted DEK $\{K_B\}S_a$ to the server device 202a/300), the server engine 304 in the server device 202a/300 may generate the deduplication identifier for the encrypted data block $\{B\}K_B$, and add the handle/ deduplication identifier combination to the client block list for the client device 206a.

As will be appreciated by one of skill in the art in possession of the present disclosure, in some embodiments the deduplication operations performed by the server device 202a/300 in the examples above may operate to deduplicate the server storage subsystem 306 in that server device 202a/300 (e.g., by ensuring that identical encrypted data blocks are not stored in that server storage subsystem 306). However, in other embodiments, the deduplication operations performed by the server device 202a/300 in the examples above may operate to deduplicate the server storage subsystems 306 in the server devices 202a-202c/300 (e.g., by ensuring that identical encrypted data blocks are not stored in any of those server storage subsystems 306).

Figure 7:
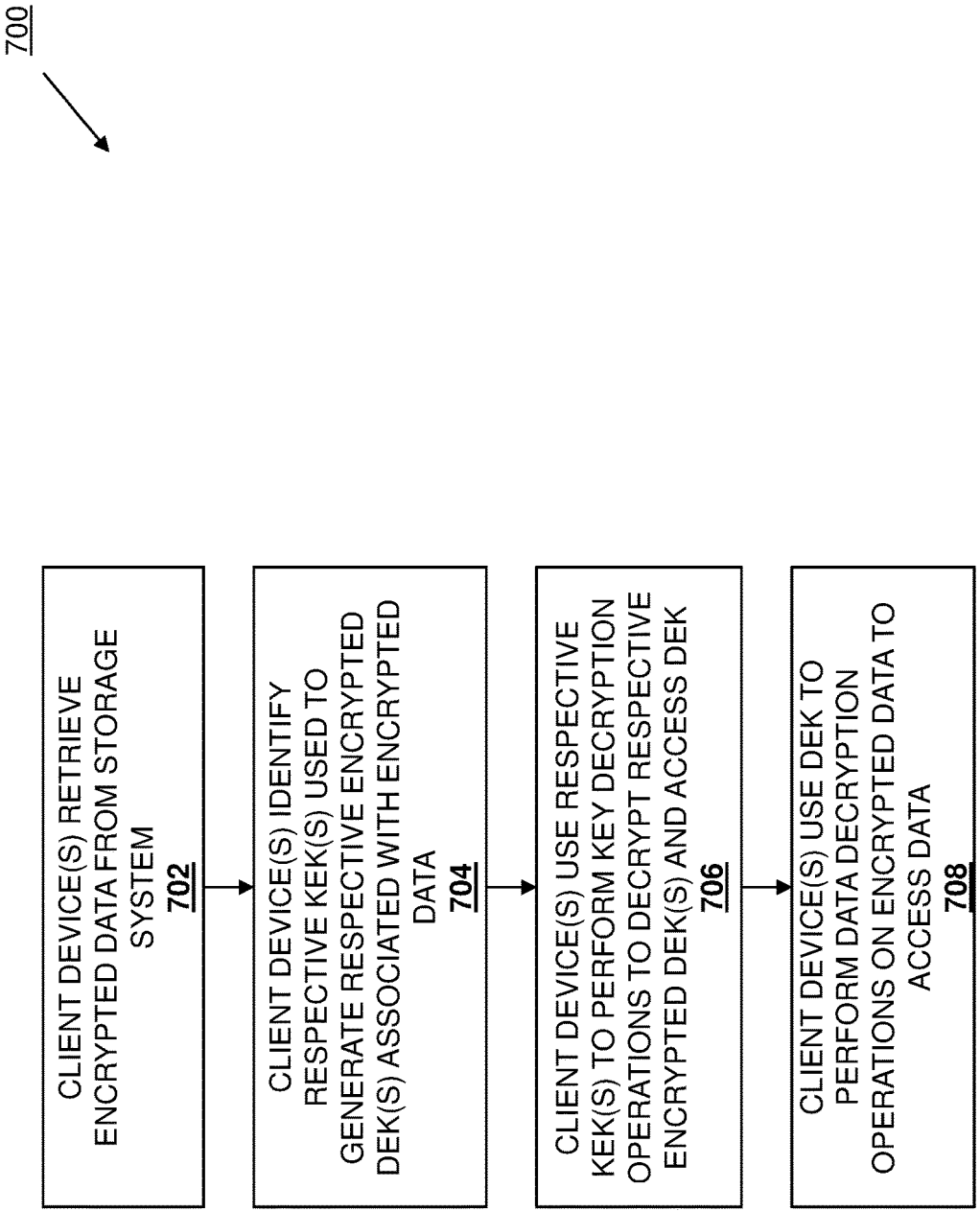
FIG. 7 is a flow chart illustrating an embodiment of a method for retrieving encrypted data stored according to the method of FIG. 5.

Referring now to FIG. 7, an embodiment of a method 700 for retrieving encrypted data is illustrated. As discussed below, the systems and methods of the present disclosure allow for the retrieval of encrypted data stored in a storage system according to the method 500. For example, a client device in the encrypted data storage system of the present disclosure may retrieve encrypted data from the storage system and, based on an association of an encrypted DEK and the encrypted data, identify a KEK. The client device may then use the KEK to perform a key decryption operation on the encrypted DEK to access a DEK, and use the DEK to perform data decryption operations on the encrypted data to access the data.

Figure 8A:
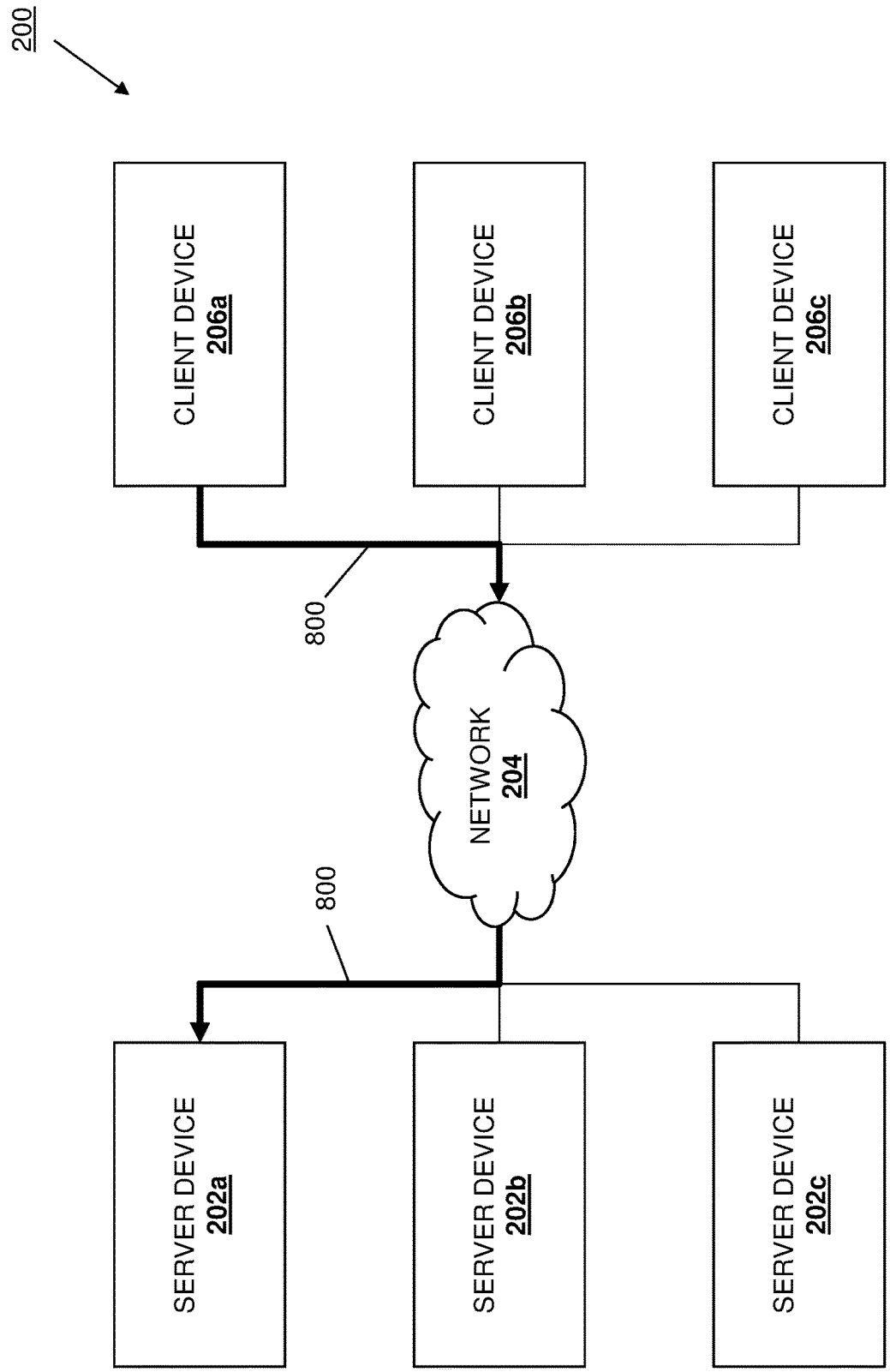
FIG. 8A is a schematic view illustrating an embodiment of the operation of the networked system of FIG. 2 during the method of FIG. 7.
Figure 8B:
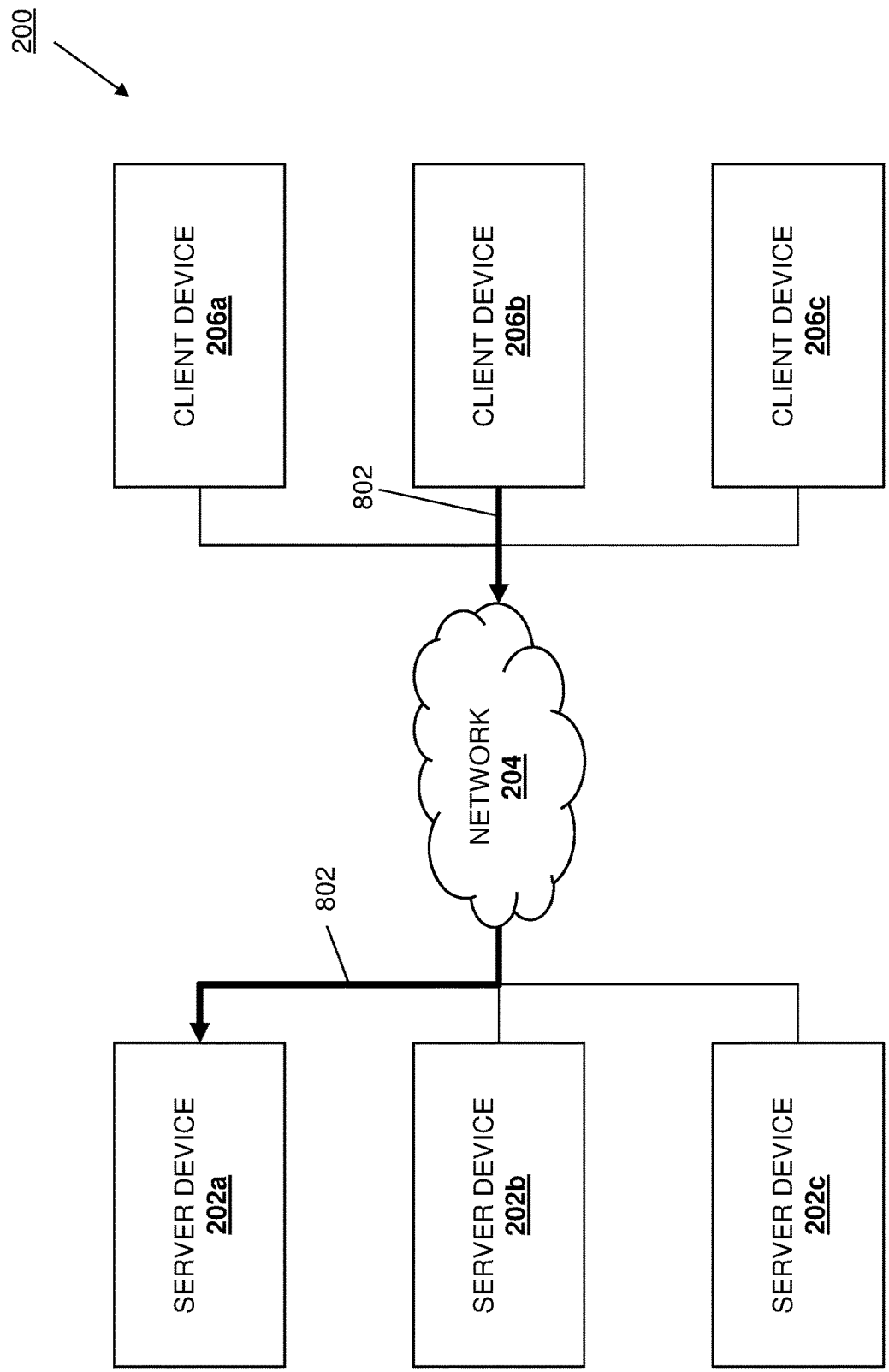
FIG. 8B is a schematic view illustrating an embodiment of the operation of the networked system of FIG. 2 during the method of FIG. 7.
Figure 8C:
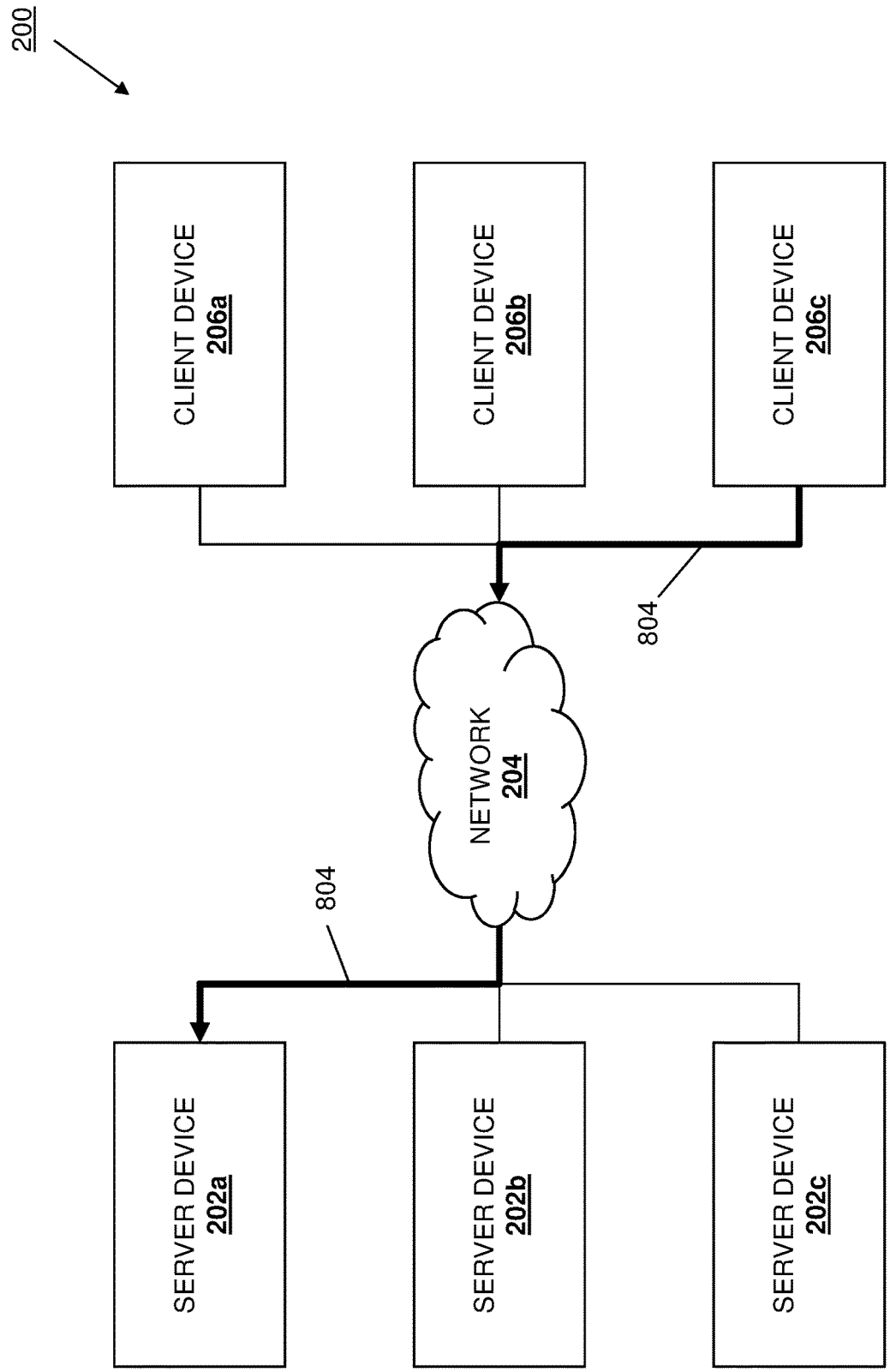
FIG. 8C is a schematic view illustrating an embodiment of the operation of the networked system of FIG. 2 during the method of FIG. 7.

The method 700 begins at block 702 where client device(s) retrieve encrypted data from a storage system. In an embodiment, at block 702, the client engine 404 in any client device 400 retrieving data according to the method 700 may operate to request an encrypted data block from the storage system (e.g., a read operation) by determining the handle for the data block that is being retrieved, and transmitting that handle to the storage system. For example, FIG. 8A illustrates how the client engine 404 in the client device 206a/400 may perform encrypted data block retrieval operations 800 that include transmitting a handle associated with a data block via the network 204 to the server device 202a. Similarly, FIG. 8B illustrates how the client engine 404 in the client device 206b/400 may perform encrypted data block retrieval operations 802 that include transmitting a handle associated with a data block via the network 204 to the server device 202a, and FIG. 8C illustrates how the client engine 404 in the client device 206c/400 may perform encrypted data block retrieval operations 804 that include transmitting a handle associated with a data block via the network 204 to the server device 202a. Furthermore, while the illustrated example describes all encrypted data blocks as being retrieved from the server device 202a, one of skill in the art in possession of the present disclosure will appreciate that encrypted data blocks may be retrieved from any of the server devices 202b and up to 202c while remaining within the scope of the present disclosure as well.

In response to receiving a handle for a data block from a client device, the storage system may utilize that handle and the client block list for that client device (which associates handles and deduplication identifiers for each encrypted data block that was stored for that client device in the storage system, as discussed above) to identify the deduplication identifier for the encrypted data block associated with that handle. The storage system may then utilize that deduplication identifier and the deduplication table (which associates deduplication identifiers and storage locations for each encrypted data block stored in the storage system) to identify the storage location of the encrypted data block associated with that deduplication identifier. Thus, the storage system may retrieve an encrypted data block based on a handle for the data block that was encrypted.

In embodiments in which the handle/deduplication identifier/encrypted DEK combination are stored in the client block list for a client device 206a, the storage system may retrieve the encrypted DEK generated by the client device requesting the encrypted data block as well, and return the handle, the encrypted data block, and that encrypted DEK to the client device. Continuing with the specific example provided above, in situations in which the client device 206a stored the encrypted data block $\{B\}K_B$ and generated the encrypted DEK $\{K_B\}S_a$, the client engine 404 in the client device 206a/400 may transmit a handle for the data block B to the server device 202a at block 702, and the server engine 304 in the server device 202a/300 may use that handle and the client block list for the client device 206a to identify the deduplication identifier for the encrypted data block $\{B\}K_B$ and the encrypted DEK $\{K_B\}S_a$ associated with that handle, use that deduplication identifier and the deduplication table to retrieve the encrypted data block $\{B\}K_B$, and transmit that handle, the encrypted data block $\{B\}K_B$, and the encrypted DEK $\{K_B\}S_a$ (as well as any associated KEK descriptors, discussed above) to the client device 206a. Similarly, in situations in which the client device 206b stored the encrypted data block $\{B\}K_B$ and generated the encrypted DEK $\{K_B\}S_b$, the client engine 404 in the client device 206b/400 may transmit a handle for the data block B to the server device 202a at block 702, and the server engine 304 in the server device 202a/300 may use that handle and the client block list for the client device 206b to identify the deduplication identifier for the encrypted data block $\{B\}K_B$ and the encrypted DEK $\{K_B\}S_b$ associated with that handle, use that deduplication identifier and the deduplication table to retrieve the encrypted data block $\{B\}K_B$, and transmit that handle, the encrypted data block $\{B\}K_B$, and the encrypted DEK $\{K_B\}S_b$ to the client device 206b.

In embodiments in which the handle and deduplication identifier combination are stored in the client block list for a client device 206a, the storage system may return the handle and the encrypted data block to the client device. Continuing with the specific example provided above, in situations in which the client device 206a stored the encrypted data block $\{B\}K_B$, the client engine 404 in the client device 206a/400 may transmit a handle for the data block B to the server device 202a at block 702, and the server engine 304 in the server device 202a/300 may use that handle and the client block list for the client device 206a to identify the deduplication identifier for the encrypted data block $\{B\}K_B$ associated with that handle, use that deduplication identifier and the deduplication table to retrieve the encrypted data block $\{B\}K_B$, and transmit that handle and the encrypted data block $\{B\}K_B$ to the client device 206a. Similarly, in situations in which the client device 206b stored the encrypted data block $\{B\}K_B$, the client engine 404 in the client device 206b/400 may transmit a handle for the data block B to the server device 202a at block 702, and the server engine 304 in the server device 202a/300 may use that handle and the client block list for the client device 206b to identify the deduplication identifier for the encrypted data block $\{B\}K_B$ associated with that handle, use that deduplication identifier and the deduplication table to retrieve the encrypted data block $\{B\}K_B$, and transmit that handle and the encrypted data block $\{B\}K_B$ to the client device 206b.

Figure 8D:
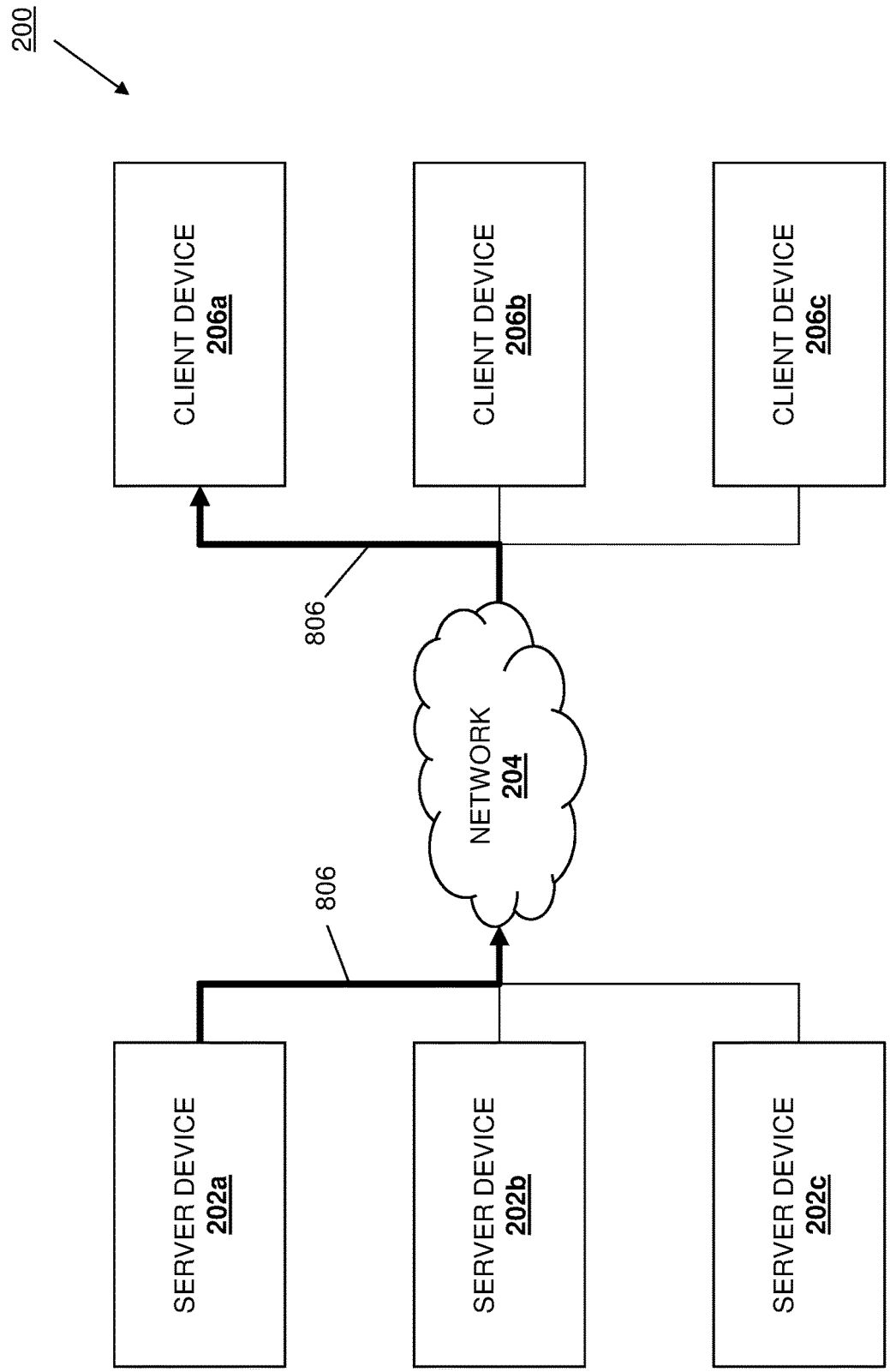
FIG. 8D is a schematic view illustrating an embodiment of the operation of the networked system of FIG. 2 during the method of FIG. 7.
Figure 8F:
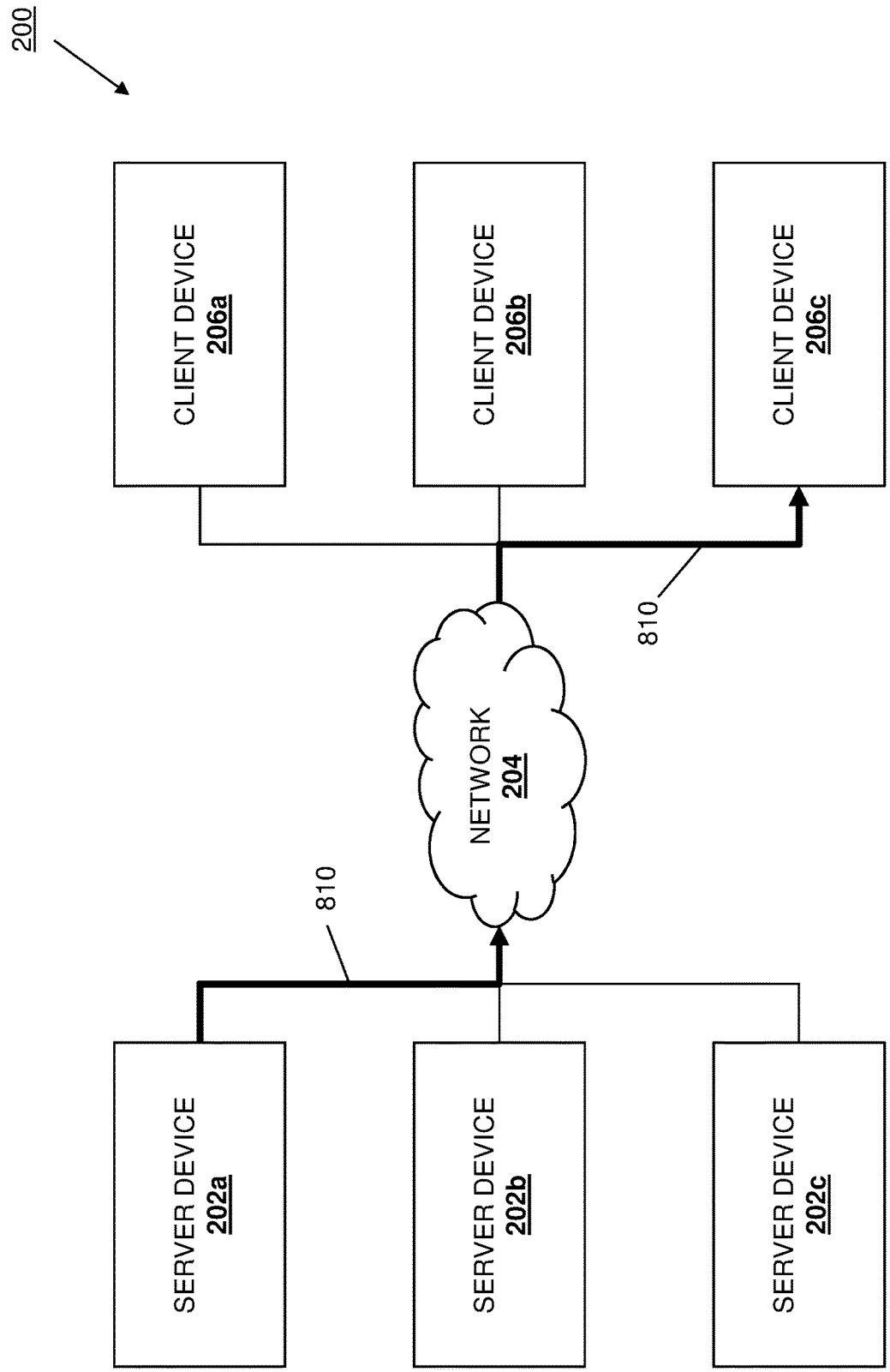
FIG. 8F is a schematic view illustrating an embodiment of the operation of the networked system of FIG. 2 during the method of FIG. 7.

As such, FIG. 8D illustrates how the server engine 304 in the server device 202a/300 may perform encrypted data block provisioning operations 806 that include transmitting the handle, the encrypted data block, and in some embodiments the encrypted DEK, via the network 204 to the client device 206a. Similarly, FIG. 8E illustrates how the server engine 304 in the server device 202a/300 may perform encrypted data block provisioning operations 808 that include transmitting the handle, the encrypted data block, and in some embodiments the encrypted DEK, via the network 204 to the client device 206b, and FIG. 8F illustrates how the server engine 304 in the server device 202a/300 may perform encrypted data block provisioning operations 810 that include transmitting the handle, the encrypted data block, and in some embodiments the encrypted DEK, via the network 204 to the client device 206c. Furthermore, while the illustrated example describes all encrypted data blocks as being provided by the server device 202a, one of skill in the art in possession of the present disclosure will appreciate that encrypted data blocks may be provided by any of the server devices 202b and up to 202c while remaining within the scope of the present disclosure as well.

The method 700 then proceeds to block 704 where the client device(s) identify respective KEK(s) used to generate respective encrypted DEK(s) associated with the encrypted data. In an embodiment, at block 704, the client engine 404 in the client device 400 that received the encrypted data block at block 702 will identify the KEK used to generate the encrypted DEK associated with that encrypted data block. In embodiments in which the handle, encrypted data, and encrypted DEK are returned to the client device 400 by the storage system at block 702, the client engine 404 in the client device 400 may identify the KEK used to generate that encrypted DEK. Continuing with the specific example provided above, in situations in which the client device 206a receives the handle, the encrypted data block $\{B\}K_B$, and the encrypted DEK $\{K_B\}S_a$ from the server device 202a at block 702, the client engine 404 in the client device 206a/400 may identify the KEK $S_a$ from that encrypted DEK $\{K_B\}S_a$. Similarly, in situations in which the client device 206b receives the handle, the encrypted data block $\{B\}K_B$, and the encrypted DEK $\{K_B\}S_b$ from the server device 202a at block 702, the client engine 404 in the client device 206b/400 may identify the KEK $S_b$ from that encrypted DEK $\{K_B\}S_b$.

In embodiments in which the handle and the encrypted data are returned to the client device 400 by the storage system at block 702, the client engine 404 in the client device 400 may identify the encrypted DEK associated with that handle, and identify the KEK used to generate the encrypted DEK. Continuing with the specific example provided above, in situations in which the client device 206a receives the handle and the encrypted data block $\{B\}K_B$ from the server device 202a at block 702, the client engine 404 in the client device 206a/400 may identify the encrypted DEK $\{K_B\}S_a$ associated with the encrypted data block in its client storage subsystem 406, and then identify the KEK $S_a$ from that encrypted DEK $\{K_B\}S_a$. Similarly, in situations in which the client device 206b receives the handle and the encrypted data block $\{B\}K_B$ from the server device 202a at block 702, the client engine 404 in the client device 206b/400 may identify the encrypted DEK $\{K_B\}S_b$ associated with the encrypted data block in its client storage subsystem 406, and then identify the KEK $S_b$ from that encrypted DEK $\{K_B\}S_b$.

As discussed above, in some embodiments, client devices may utilize KEKs in combination in order to encrypt a DEK, and thus some embodiments of block 704 may include the client engine in those client devices identifying more than one KEK used to generate an encrypted DEK associated with the encrypted data block. Continuing with the example provided above in which the client device 206a/400 generated a KEK ($S_a$ or $S_{Mar2022}$) by performing an XOR operation on the KEK $S_a$ and the KEK $S_{Mar2022}$, at block 704 the client engine 404 in the client device 206a/400 may identify the KEK $S_a$ and the KEK $S_{Mar2022}$. Similarly, continuing with the example provided above in which the client device 206a/400 used multiple KEKs to encrypt a DEK by encrypting that DEK with the KEK $S_a$ to generate an encrypted DEK $\{K_B\}S_a$, and encrypting that DEK with the KEK $S_{Mar2022}$ to generate an encrypted DEK $\{K_B\}S_{Mar2022}$, at block 704 the client engine 404 in the client device 206a/400 may identify the KEK $S_a$ or the KEK $S_{Mar2022}$. As will be appreciated by one of skill in the art in possession of the present disclosure, the identification of multiple KEKs used to generate one or more DEKs for an encrypted data block may utilize the KEK descriptors discussed above.

The method 700 then proceeds to block 706 where the client device(s) use the respective KEK(s) to perform key decryption operations to decrypt the respective encrypted DEK(s) and access the DEK. In an embodiment, at block 706, the client engine 404 in any client device 400 retrieving an encrypted data block at block 702 may operate to utilize the KEK identified at block 704 to perform key decryption operations on the encrypted DEK associated with that encrypted data block (e.g., transmitted along with that encrypted data block by the storage system, associated with that encrypted data block in the client storage subsystem 406, etc.) Continuing with the specific example provided above, the client engine 404 in the client device 206a/400 may perform a variety of key decryption operations known in the art using the KEK $S_a$ in order to decrypt the encrypted DEK $\{K_B\}S_a$ and access the DEK $K_B$. Similarly, the client engine 404 in the client device 206b/400 may perform a variety of key decryption operations known in the art using the KEK $S_b$ in order to decrypt the encrypted DEK $\{K_B\}S_b$ and access the DEK $K_B$.

In embodiments in which client devices utilize KEKs in combination in order to encrypt a DEK, block 706 may include the client engine in those client devices using more than one KEK to decrypt an encrypted DEK associated with the encrypted data block. Continuing with the example provided above in which the client device 206a/400 generated a KEK ($S_a$ or $S_{Mar2022}$) by performing an XOR operation on the KEK $S_a$ and the KEK $S_{Mar2022}$, at block 706 the client engine 404 in the client device 206a/400 may use the KEK $S_a$ and the KEK $S_{Mar2022}$. to generate the KEK ($S_a$ or $S_{Mar2022}$), and perform a variety of key decryption operations known in the art using the KEK ($S_a$ or $S_{Mar2022}$) in order to decrypt the encrypted DEK $\{K_B\}$ ($S_a$ or $S_{Mar2022}$) and access the DEK $K_B$. Similarly, continuing with the example provided above in which the client device 206a/400 used multiple KEKs to encrypt a DEK by encrypting that DEK with the KEK $S_a$ to generate an encrypted DEK $\{K_B\}S_a$, and encrypting that DEK with the KEK $S_{Mar2022}$ to generate an encrypted DEK $\{K_B\}S_{Mar2022}$, at block 706 the client engine 404 in the client device 206a/400 may either perform a variety of key decryption operations known in the art using the KEK $S_a$ in order to decrypt the encrypted DEK $\{K_B\}$ $S_a$ and access the DEK $K_B$, or perform a variety of key decryption operations known in the art using the KEK $S_{Mar2022}$ in order to decrypt the encrypted DEK $\{K_B\}$ $S_{Mar2022}$ and access the DEK $K_B$.

The method 700 then proceeds to block 708 where the client device(s) use the DEK to perform data decryption operations on the encrypted data to access the data. In an embodiment, at block 708, the client engine 404 in any client device 400 accessing a DEK at block 706 may operate to utilize that DEK to perform data decryption operations on the encrypted data block. Continuing with the specific example provided above, the client engine 404 in the client device 206a/400 may perform a variety of data decryption operations known in the art using the DEK $K_B$ in order to decrypt the encrypted data block $\{B\}K_B$ and access the data block B. Similarly, the client engine 404 in the client device 206b/400 may perform a variety of data decryption operations known in the art using the DEK $K_B$ in order to decrypt the encrypted data block $\{B\}K_B$ and access the data block B.

Figure 9:
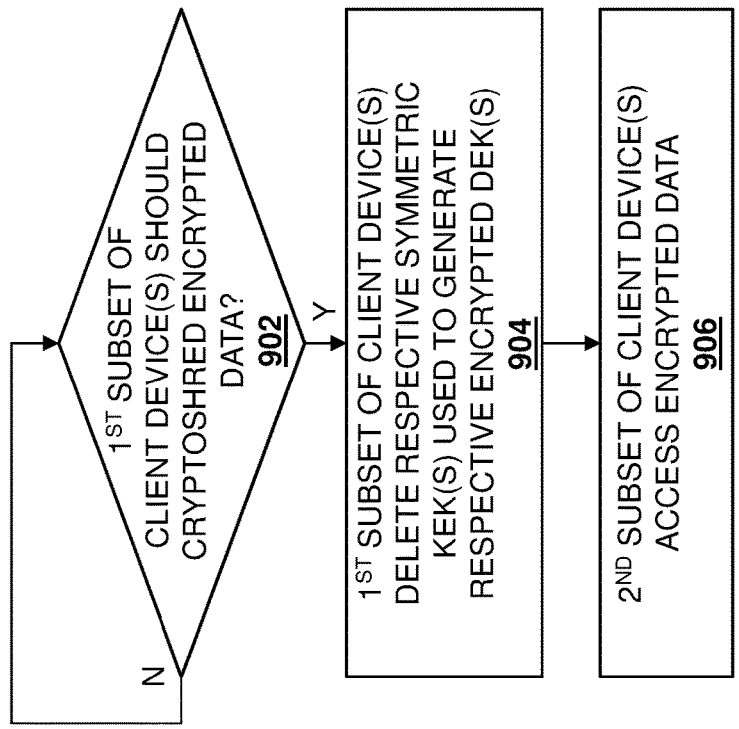
FIG. 9 is a flow chart illustrating an embodiment of a method for cryptoshredding encrypted data stored according to the method of FIG. 5.

Referring now to FIG. 9, an embodiment of a method 900 for cryptoshredding encrypted data is illustrated. As discussed below, the systems and methods of the present disclosure allow for the cryptoshredding of encrypted data stored in a storage system according to the method 500. For example, a first client device in the encrypted data storage system of the present disclosure may delete a first KEK that was used to encrypt a DEK used to generate encrypted data in order to prevent that first client device from accessing that encrypted data stored on the storage system, while a second client in the encrypted data storage system of the present disclosure may continue to access that encrypted data stored on the storage system using a second KEK that was used to encrypt the DEK used to generate that encrypted data.

The method 900 begins at decision block 902 where the method 900 proceeds depending on whether a first subset of client device(s) should cryptoshred encrypted data. In an embodiment, at decision block 902, the method 900 will proceed depending on whether encrypted data should be cryptoshredded according to one or more cryptoshredding policies, rules, configurations, or other reasons that would be apparent to one of skill in the art in possession of the present disclosure. As such, while the specific examples provided herein discuss the cryptoshredding of data based on the identity of the client device that stored it, a current time/time period, and a folder in which that data is stored in on a client device, one of skill in the art in possession of the present disclosure will appreciate that the KEKs utilized in the cryptoshredding of the present disclosure may be configured to provide for cryptoshredding of data belonging to any data class and based on any criteria desired by a user of the encrypted data storage system described herein. If, at decision block 902, a first subset of the client device(s) should not cryptoshred encrypted data, the method 900 returns to block 902. As such, the method 900 may provide for the monitoring of whether a first subset of client device(s) should cryptoshred encrypted data, or may otherwise pause until a policy, rule, configuration, or other reason is triggered that provides for the cryptoshredding of encrypted data.

If at decision block 902, it is determined that a first subset of the client device(s) should cryptoshred encrypted data, the method 900 proceeds to block 904 where the first subset of client device(s) delete respective symmetric KEK(s) that were used to generate respective encrypted DEK(s). In an embodiment, at block 904, the client engine 404 in any client device 400 that should cryptoshred encrypted data at decision block 902 based on a policy, rule, configuration, or other reason, may operate to delete the KEK it used to generate the encrypted DEK from the DEK that was used to generate that encrypted data. Continuing with the specific example provided above in which the client engine 404 in the client device 206a/400 encrypted the data block B with the DEK $K_B$ to generate the encrypted data block $\{B\}K_B$, and encrypted the DEK $K_B$ with the KEK $S_a$ to generate the encrypted DEK $\{K_B\}S_a$, at block 904 the client engine 404 in the client device 206a/400 may then delete the KEK $S_a$. As will be appreciated by one of skill in the art in possession of the present disclosure, the deletion of the KEK $S_a$ will prevent the client engine 404 in the client device 206a/400 from decrypting the encrypted DEK $\{K_B\}S_a$ to access the DEK $K_B$, thus preventing the client engine 404 in the client device 206a/400 from decrypting the encrypted data block $\{B\}K_B$. As such, from the point of view of the client device 206a, the data block B has been cryptoshredded and is permanently unavailable, and one of skill in the art in possession of the present disclosure will recognize how similar operations may be performed by any client device in order to cryptoshred any encrypted data blocks generated by that client device using a client-specific KEK.

As discussed above, in some embodiments client devices may utilize KEKs in combination in order to encrypt a DEK, and thus some embodiments of block 904 may include the client engine in those client devices deleting at least one KEK that was used to generate an encrypted DEK associated with the encrypted data block that is being cryptoshredded. Continuing with the example provided above in which the client device 206a/400 generated a KEK ($S_a$ or $S_{Mar2022}$) by performing an XOR operation on the KEK $S_a$ and the KEK $S_{Mar2022}$, at block 704 the client engine 404 in the client device 206a/400 may delete the KEK $S_a$ or the KEK $S_{Mar2022}$ in order to prevent the client engine 404 in the client device 206a/400 from decrypting the encrypted DEK $\{K_B\}(S_a \text{ XOR } S_{Mar2022})$ to access the DEK $K_B$, thus preventing the client engine 404 in the client device 206a/400 from decrypting the encrypted data block $\{B\}K_B$. Similarly, continuing with the example provided above in which the client device 206a/400 used multiple KEKs to encrypt a DEK by encrypting that DEK with the KEK $S_a$ to generate an encrypted DEK $\{K_B\}S_a$, and encrypting that DEK with the KEK $S_{Mar2022}$ to generate an encrypted DEK $\{K_B\}S_{Mar2022}$, at block 904 the client engine 404 in the client device 206a/400 may delete both the KEK $S_a$ and the KEK $S_{Mar2022}$ in order to prevent the client engine 404 in the client device 206a/400 from decrypting the encrypted DEK $\{K_B\}S_a$ or the encrypted DEK $\{K_B\}S_{Mar2022}$ to access the DEK $K_B$, thus preventing the client engine 404 in the client device 206a/400 from decrypting the encrypted data block $\{B\}$ Kg.

In some embodiments, two or more of the client devices 206a, 206b, and up to 206c may share a time-based KEK (e.g., the KEK $S_{Mar2022}$ in the examples above), which may be retrieved by those client devices from the key management system (e.g., the server system accessed using KMIP as discussed above). Thus, one of skill in the art in possession of the present disclosure will appreciate that groups of client devices may encrypt data blocks using corresponding DEKs generated for those data blocks, encrypt those DEKs with the time-based KEK, and then may each delete their copy of the time-based KEK in order to cryptoshred any encrypted data blocks encrypted with a DEK that was encrypted using that time-based KEK. While this time-based KEK procedure opens up the possibility of a misbehaving client device not deleting its copy of the time-based KEK, one of skill in the art in possession of the present disclosure will appreciate that such issues may be addressed by having all the client devices have a unique copy of time-based KEKs that are all configured to be deleted at the same time/time period (and thus a misbehaving client device will only interfere with the crypto-erase of the encrypted data that it stored).

The method 900 then proceeds to block 906 where a second subset of client device(s) access the encrypted data. In an embodiment, at block 906, the client engine 404 in any client device 400 that should not cryptoshred encrypted data at decision block 902 based on a policy, rule, configuration, or other reason, may continue to access that encrypted data. Continuing with the example above, the client engine 404 in the client device 206b/400 may have also encrypted the data block B with the DEK $K_B$ to generate the encrypted data block $\{B\}K_B$, and encrypted the DEK $K_B$ with the KEK $S_b$ to generate the encrypted DEK $\{K_B\}S_b$, and if the client device 206b is not included in the subset of client device(s) that should cryptoshred the data block B at decision block 902, the client device 206b will continue to have access to the KEK $S_b$. As will be appreciated by one of skill in the art in possession of the present disclosure, the continued access to the KEK $S_b$ will allow the client engine 404 in the client device 206b/400 to decrypt the encrypted DEK $\{K_B\}S_b$ to access the DEK $K_B$, thus allowing the client engine 404 in the client device 206b/400 to decrypt the encrypted data block $\{B\}K_B$ and access the data block B while the client engine 404 in the client device 206a/400 is prevented from accessing that data block B due to the cryptoshredding operations discussed above.

In some embodiments, it may be desirable to "rollover" or replace KEKs used in the encrypted data storage system of the present disclosure, and such rollover/replacement functionality may be accomplished by having client devices identify a KEK version of the KEK used when writing encrypted data blocks to the storage system (e.g., by providing the handle, KEK version, encrypted data block, and encrypted DEK in some embodiments). The storage system will then store that KEK version in the client block list for that client device (e.g., along with the handle, deduplication identifier, and encrypted DEK in some embodiments). Subsequently, in response to read operations by the client device, the server will return the handle, KEK version, encrypted data block, and encrypted DEK in some embodiments). As will be appreciated by one of skill in the art in possession of the present disclosure, the provisioning of the KEK version of a KEK is useful to the client device in determining which KEK to use to decrypt the DEK.

Thus, systems and methods have been described that allow for the encryption of data to provide encrypted data for storage in a storage system in a manner that allows that storage system to performed deduplication operations based on that encrypted data without the need for that storage system to have access to the unencrypted data or the encryption keys used to encrypt it. The systems and methods of the present disclosure also allow for retrieval of that encrypted data, and granular cryptoshredding operations on encrypted data stored in that storage system as well.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An encrypted data storage system, comprising:
a storage system that is configured to store encrypted data; and
a first client device that is coupled to the storage system, wherein the first client device is configured to:
perform a hash operation on first data that is included in a first data class in order to generate a first Data Encryption Key (DEK);
perform, using the first DEK, a data encryption operation on the first data to generate encrypted first data;
perform, using a first Key Encryption Key (KEK) that is associated with the first data class, a first key encryption operation on the first DEK to generate a first encrypted DEK;
associate the first encrypted DEK with the encrypted first data;
transmit, to the storage system for storage, the encrypted first data;
perform the hash operation on second data that is included in a second data class in order to generate a second DEK;
perform, using the second DEK, a data encryption operation on the second data to generate encrypted second data;
perform, using a second KEK that is associated with the second data class, a second key encryption operation on the second DEK to generate a second encrypted DEK;
associate the second encrypted DEK with the encrypted second data;
transmit, to the storage system for storage, the encrypted second data; and
determine that the first data class should be cryptoshredded and, in response, delete the first KEK to prevent the first client device from accessing the encrypted first data stored on the storage system.

2. The system of claim 1, wherein the system further comprises:
a second client device that is coupled to the storage system, wherein the second client device is configured to:
perform the hash operation on the first data to generate the first DEK;
perform, using the first DEK, the data encryption operation on the first data to generate the encrypted first data;
perform, using a third KEK that is different than the first KEK, a third key encryption operation on the first DEK to generate a third encrypted DEK;
associate the third encrypted DEK with the encrypted first data;
transmit, to the storage system for storage, the encrypted first data; and
access, using the third KEK and subsequent to the first client device deleting the first KEK to prevent the first client device from accessing the encrypted first data, the encrypted first data.

3. The system of claim 2, wherein each of the first client device and the second client device is configured to:
perform the hash operation on the first data and a secret value that is shared between the first client device and the second client device to generate the first DEK.

4. The system of claim 1, wherein the associating the first encrypted DEK and the encrypted first data includes:
transmitting, to the storage system for storage along with the encrypted first data, the first encrypted DEK as metadata for the encrypted first data.

5. The system of claim 1, wherein the first client device is configured to:
receive, from the storage system, the encrypted second data;
identify, based on the association of the second encrypted DEK and the encrypted second data, the second KEK;
perform, using the second KEK, a first key decryption operation on the second encrypted DEK to access the DEK; and
perform, using the DEK, data decryption operations on the encrypted second data to access the second data.

6. The system of claim 1, wherein the first client device is configured to:
perform the second key encryption operation on the DEK to generate the second encrypted DEK using the second KEK and a third KEK.

7. The system of claim 6, wherein the second KEK is unique to the first client device, and the third KEK is a time-based KEK.

8. An Information Handling System (IHS), comprising:
a processing system including at least one hardware processor; and
a memory system that is coupled to the processing system and that includes instructions that, when executed by the processing system, cause the processing system to provide a client engine that is configured to:
perform a hash operation on first data that is included in a first data class in order to generate a first Data Encryption Key (DEK);
perform, using the first DEK, a data encryption operation on the first data to generate encrypted first data;

perform, using a first Key Encryption Key (KEK) that is associated with the first data class, a first key encryption operation on the first DEK to generate a first encrypted DEK;

associate the first encrypted DEK with the encrypted first data;

transmit, to a storage system for storage, the encrypted first data;

perform the hash operation on second data that is included in a second data class in order to generate a second DEK;

perform, using the second DEK, a data encryption operation on the second data to generate encrypted second data;

perform, using a second KEK that is associated with the second data class, a second key encryption operation on the second DEK to generate a second encrypted DEK;

associate the second encrypted DEK with the encrypted second data;

transmit, to the storage system for storage, the encrypted second data; and determine that the first data class should be cryptoshredded and, in response, delete the first KEK to prevent the first client device from accessing the encrypted first data stored on the storage system.

9. The IHS of claim 7, wherein the client engine that is configured to:
perform the hash operation on the first data and a shared secret value to generate the first DEK.

10. The IHS of claim 7, wherein the associating the first encrypted DEK and the encrypted first data includes:
transmitting, to the storage system for storage along with the encrypted first data, the first encrypted DEK as metadata for the encrypted first data.

11. The IHS of claim 7, wherein the client engine is configured to:
receive, from the storage system, the encrypted second data;
identify, based on the association of the second encrypted DEK and the encrypted second data, the second KEK;
perform, using the second KEK, a first key decryption operation on the second encrypted DEK to access the DEK; and
perform, using the DEK, data decryption operations on the encrypted second data to access the second data.

12. The IHS of claim 7, wherein the client engine is configured to:
perform the second key encryption operation on the DEK to generate the second encrypted DEK using the second KEK and a third KEK.

13. The IHS of claim 12, wherein the second KEK is unique to the client engine, and the third KEK is a time-based KEK.

14. A method for storing encrypted data, comprising:
performing, by a first client device, a hash operation on first data that is included in a first data class in order to generate a first Data Encryption Key (DEK);
performing, by the first client device using the first DEK, a data encryption operation on the first data to generate encrypted first data;
performing, by the first client device using a first Key Encryption Key (KEK) that is associated with the first data class, a first key encryption operation on the first DEK to generate a first encrypted DEK;
associating, by the first client device, the first encrypted DEK with the encrypted first data;

transmitting, by the first client device to a storage system for storage, the encrypted first data;
performing, by the first client device, the hash operation on second data that is included in a second data class in order to generate a second DEK;
performing, by the first client device using the second DEK, a data encryption operation on the second data to generate encrypted second data;
performing, by the first client device using a second KEK that is associated with the second data class, a second key encryption operation on the second DEK to generate a second encrypted DEK;
associating, by the first client device, the second encrypted DEK with the encrypted second data;
transmitting, by the first client device to the storage system for storage, the encrypted second data; and
determining, by the first client device, that the first data class should be cryptoshredded and, in response, deleting the first KEK to prevent the first client device from accessing the encrypted first data stored on the storage system.

15. The method of claim 14, further comprising:
performing, by a second client device, the hash operation on the first data to generate the first DEK;
performing, by the second client device using the first DEK, the data encryption operation on the first data to generate the encrypted first data;
performing, by the second client device using a third KEK that is different than the first KEK, a third key encryption operation on the first DEK to generate a third encrypted DEK;
associating, by the second client device, the third encrypted DEK with the encrypted first data;
transmitting, by the second client device to the storage system for storage, the encrypted first data; and
accessing, by the second client device using the third KEK and subsequent to the first client device deleting the first KEK to prevent the first client device from accessing the encrypted first data, the encrypted first data.

16. The method of claim 15, further comprising:
performing, by the first client device, the hash operation on the first data and a shared secret value to generate the first DEK.

17. The method of claim 14, wherein the associating the first encrypted DEK and the encrypted first data includes:
transmitting, by the first client device to the storage system for storage along with the encrypted first data, the first encrypted DEK as metadata for the encrypted first data.

18. The method of claim 14, further comprising:
receiving, by the first client device from the storage system, the encrypted second data;
identifying, by the first client device based on the association of the second encrypted DEK and the encrypted second data, the second KEK;
performing, by the first client device using the second KEK, a first key decryption operation on the second encrypted DEK to access the DEK; and
performing, by the first client device using the DEK, data decryption operations on the encrypted second data to access the second data.

19. The method of claim 14, further comprising:
performing, by the first client device, the second key encryption operation on the DEK to generate the second encrypted DEK using the second KEK and a third KEK.

20. The method of claim 19, wherein the second KEK is unique to the first client device, and the third KEK is a time-based KEK.

\* \* \* \* \*